United States Patent
Si et al.

(10) Patent No.: US 11,627,593 B2
(45) Date of Patent: Apr. 11, 2023

(54) HARQ-ACK FEEDBACK METHOD, TERMINAL, AND NETWORK SIDE DEVICE

(71) Applicant: DATANG MOBILE COMMUNICATIONS EQUIPMENT CO., LTD., Beijing (CN)

(72) Inventors: Qianqian Si, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/632,557

(22) PCT Filed: Jul. 22, 2020

(86) PCT No.: PCT/CN2020/103500
§ 371 (c)(1),
(2) Date: Feb. 3, 2022

(87) PCT Pub. No.: WO2021/023011
PCT Pub. Date: Feb. 11, 2021

(65) Prior Publication Data
US 2022/0272734 A1    Aug. 25, 2022

(30) Foreign Application Priority Data

Aug. 8, 2019   (CN) .......................... 201910731405.5

(51) Int. Cl.
*H04W 72/1273*    (2023.01)
*H04L 1/1812*    (2023.01)
(Continued)

(52) U.S. Cl.
CPC ....... *H04W 72/1273* (2013.01); *H04L 1/1812* (2013.01); *H04L 5/0053* (2013.01); *H04W 72/0446* (2013.01); *H04W 72/1278* (2013.01)

(58) Field of Classification Search
CPC combination set(s) only.
See application file for complete search history.

(56) References Cited

U.S. PATENT DOCUMENTS

| 9,571,236 B2 * | 2/2017 | Lin .................. H04W 72/0413 |
| 2015/0043394 A1 * | 2/2015 | Lin ....................... H04L 1/1812 |
| | | 370/280 |

(Continued)

FOREIGN PATENT DOCUMENTS

| CN | 109600212 A | 4/2019 |
| CN | 109639398 A | 4/2019 |

(Continued)

OTHER PUBLICATIONS

Ericsson: "HARQ and Scheduling Enhancements for NR-U", 3GPP Draft; R1-1907456 HARQ and Scheduling Enhancements for NR-U, vol. RAN WG1, May 4, 2019 (May 4, 2019), Reno, NV, USA, pp. 1-15, XP051709469.

(Continued)

*Primary Examiner* — Hanh N Nguyen
(74) *Attorney, Agent, or Firm* — Harness, Dickey & Pierce, P.L.C.

(57) ABSTRACT

An HARQ-ACK feedback method, a terminal and a network side device are provided. The method includes: when a HARQ-ACK of a PDSCH is required to be transmitted on a PUSCH scheduled by uplink DCI in a multiplexing mode, if the uplink DCI includes a DAI, determining an HARQ-ACK feedback codebook transmitted on the PUSCH, based on at least one of a judgement result of whether the PDSCH scheduled before the uplink DCI is required to transmit the HARQ-ACK on the PUSCH in a multiplexing mode or the DAI, and a maximum quantity of PDSCHs capable of being transmitted after the uplink DCI.

18 Claims, 4 Drawing Sheets

(51) Int. Cl.
*H04L 5/00* (2006.01)
*H04W 72/0446* (2023.01)
*H04W 72/12* (2023.01)

(56) References Cited

U.S. PATENT DOCUMENTS

| | | | |
|---|---|---|---|
| 2016/0248551 A1 | 8/2016 | Larsson et al. | |
| 2017/0026940 A1 | 1/2017 | Moulsley | |
| 2019/0103947 A1 | 4/2019 | Park | |
| 2019/0363840 A1* | 11/2019 | Wang | H04L 5/0055 |
| 2020/0213044 A1 | 7/2020 | Peng et al. | |
| 2020/0280969 A1 | 9/2020 | Liu et al. | |
| 2021/0282171 A1* | 9/2021 | Wu | H04L 1/1887 |
| 2021/0337538 A1* | 10/2021 | Li | H04W 72/0413 |

FOREIGN PATENT DOCUMENTS

| | | |
|---|---|---|
| CN | 109842476 A | 6/2019 |
| WO | WO-2018228487 A1 | 12/2018 |
| WO | WO-2019/095314 A1 | 5/2019 |
| WO | WO-2019/105341 A1 | 6/2019 |

OTHER PUBLICATIONS

Wilus Inc: "Remaining Issues on HARQ-ACK Transmission on CA", 3GPP Draft; R1-1809323, vol. RAN WG1, Aug. 11, 2018 (Aug. 11, 2018), Gothenburg SE, pp. 1-8, XP051516687.
Chinese Office Action for Chinese Application No. 201910731405.5 dated Nov. 3, 2021.
3GPP TSG RAN WG1 Meeting #92, "Remaining details on UCI multiplexing", R1-1802107, dated Mar. 2, 2018.
3GPP TSG-RAN WG1 Meeting #97, "Signalling reduction for beam-based UL power control" Tdoc R1-1907475, dated May 13-17, 2019.
3GPP TSG RAN WG1 Meeting #96b, "UCI enhancements for URLLC" R1-1903955, dated Apr. 8-12, 2019.
International Search Report and Written Opinion for International Application No. PCT/CN2020/103500 dated Oct. 14, 2020.
Extended European Search Report dated Sep. 1, 2022 for EP Application No. 20850961.2.

* cited by examiner

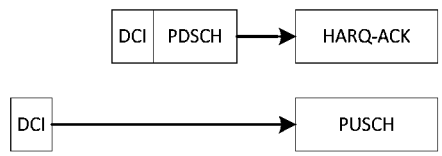

Fig. 1

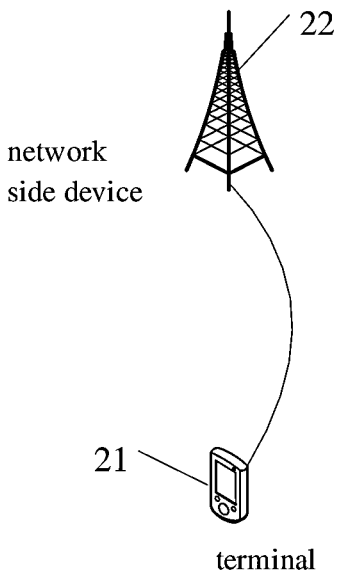

Fig. 2 when a HARQ-ACK of a PDSCH is required to be transmitted on a PUSCH scheduled by uplink DCI in a multiplexing mode, if the uplink DCI includes a DAI, determining by the terminal, an HARQ-ACK feedback codebook transmitted on the PUSCH, based on at least one of a judgement result of whether the PDSCH scheduled before the uplink DCI is required to transmit the HARQ-ACK on the PUSCH in a multiplexing mode or the DAI, and a maximum quantity of PDSCHs capable of being transmitted after the uplink DCI — 301

Fig. 3

HARQ-ACK FEEDBACK METHOD, TERMINAL, AND NETWORK SIDE DEVICE

CROSS-REFERENCE TO RELATED APPLICATIONS

The present application is the U.S. national phase of PCT Application PCT/CN2020/103500 filed on Jul. 22, 2020, which claims a priority of Chinese patent application No. 201910731405.5 filed on Aug. 8, 2019, which is incorporated herein by reference in its entirety.

TECHNICAL FIELD

The present disclosure relates to the field of communications technologies, and in particular, to an HARQ-ACK feedback method, a terminal and a network side device.

BACKGROUND

In the related art, in the fifth Generation mobile communication technology-New air interface (5G NR), a terminal, which may also be referred to as a User Equipment (UE), does not expect an Uplink transmitted after scheduling a Physical Uplink Shared Channel (PUSCH) or a Downlink transmitted after Uplink (UL) Downlink Control Information (DCI), may be referred to as a Downlink multiplexed transmitted after Downlink (DL) DCI scheduled Physical Downlink Shared Channel (PDSCH), that is, if there is a DCI scheduled PUSCH, a PUCCH resource used by a PDSCH scheduled after the DCI for transmitting the ACK cannot collide with a PUSCH resource used by PUCCH feedback, which is a problem of Ultra-Reliable and Low-Latency communication, URLLC) UE, the transmission delay of HARQ-ACK feedback may be increased. As shown in FIG. 1, a base station schedules PUSCH transmission through a DCI, when data of a downlink URLLC arrives, in order to transmit and receive feedback as soon as possible, the base station may indicate a Physical Uplink Control Channel (PUCCH) resource overlapping with the PUSCH to carry HARQ-ACK during scheduling, and if such scheduling is not allowed to occur, the base station needs to indicate a later PUCCH resource, which may cause a large transmission delay, and the URLLC service requires a low delay, which requires a relaxation of such scheduling restriction.

In summary, it may be supported in the future that HARQ-ACKs corresponding to DL DCIs transmitted after UL DCIs for scheduling PUSCH transmission are multiplexed and transmitted on the PUSCH, but since a Downlink Assignment Index (DAI) included in the UL DCI cannot indicate PDSCH transmission for scheduling later, there is no specific scheme for determining the HARQ-ACK feedback codebook in this case.

SUMMARY

The embodiment of the disclosure provides a HARQ-ACK feedback method, a terminal and network side device, which are used for solving the problem that no specific scheme for determining a HARQ-ACK feedback codebook exists under the condition that HARQ-ACK corresponding to a PDSCH (physical downlink shared channel) scheduled by DL DCI (downlink control information) transmitted after UL DCI (uplink control information) transmitted by a PUSCH (physical uplink shared channel) is transmitted on the PUSCH in a multiplexing manner.

A hybrid automatic repeat request-acknowledgement (HARQ-ACK) feedback method, performed by a terminal and including:

when a HARQ-ACK of a physical downlink shared channel (PDSCH) is required to be transmitted on a physical uplink shared channel (PUSCH) scheduled by uplink downlink control information (DCI) in a multiplexing mode, if the uplink DCI includes a downlink assignment index (DAI), determining an HARQ-ACK feedback codebook transmitted on the PUSCH, based on at least one of a judgement result of whether the PDSCH scheduled before the uplink DCI is required to transmit the HARQ-ACK on the PUSCH in a multiplexing mode or the DAI, and a maximum quantity of PDSCHs capable of being transmitted after the uplink DCI.

Optionally, the judgement result is obtained according to the DAI in the uplink DCI, or according to the DAI in the uplink DCI and a judgement result of whether a first physical downlink control channel (PDCCH) is received in a PDCCH detection opportunity before the uplink DCI and a PDCCH detection opportunity in which the uplink DCI is located, where the first PDCCH is a PDCCH corresponding to a PDSCH transmission where an HARQ-ACK feedback is required to be performed on the PUSCH, or a PDCCH corresponding to a semi-persistent scheduling (SPS) PDSCH release.

Optionally, the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI if the uplink DCI includes the DAI includes:

when the terminal is configured with a semi-static codebook, if the judgement result is that the PDSCH scheduled before the uplink DCI is required to transmit the HARQ-ACK on the PUSCH in a multiplexing mode, generating the HARQ-ACK feedback codebook based on a set of all PDSCH positions where the HARQ-ACK is required to be transmitted on the PUSCH;

when the terminal is configured with a semi-static codebook, if the judgement result is that the PDSCH scheduled before the uplink DCI is not required to transmit the HARQ-ACK on the PUSCH in a multiplexing mode, generating a HARQ-ACK feedback codebook based on a set of PDSCH positions subsequent to the uplink DCI and in which the HARQ-ACK is required to be transmitted on the PUSCH.

Optionally, the set of all PDSCH positions where the HARQ-ACK is required to be transmitted on the PUSCH is determined according to at least one of HARQ-ACK feedback timing sequence, a semi-static slot structure or PDSCH candidate time domain resource allocation information;

the set of PDSCH positions subsequent to the uplink DCI and in which the HARQ-ACK is required to be transmitted on the PUSCH is:

the set of PDSCH positions subsequent to the uplink DCI, in the set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is transmitted in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity;

where the second PDCCH detection opportunity is configured to transmit the uplink DCI.

Optionally, the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI if the uplink DCI includes the DAI includes:

when the terminal is configured with a dynamic codebook, if the judgement result is that the PDSCH scheduled before the uplink DCI is required to transmit the HARQ-ACK on the PUSCH in a multiplexing mode, generating the HARQ-ACK feedback codebook based on all PDCCH detection opportunity sets and the DAI;

when the terminal is configured with a dynamic codebook, if the judgement result is that the PDSCH scheduled before the uplink DCI is not required to transmit the HARQ-ACK on the PUSCH in a multiplexing mode, generating the HARQ-ACK feedback codebook based on a PDCCH detection opportunity set subsequent to the uplink DCI.

Optionally, the PDCCH detection opportunity set is determined based on a HARQ-ACK feedback timing sequence and a PDCCH-to-PDSCH scheduling slot offset value.

Optionally, the generating the HARQ-ACK feedback codebook based on all PDCCH detection opportunity sets and the DAI includes:

generating a first part of feedback codebook based on the PDCCH detection opportunity set prior to the uplink DCI and the PDCCH received in the PDCCH detection opportunity where the uplink DCI is located and the DAI;

generating a second part of feedback codebook based on a PDCCH detection opportunity set subsequent to the uplink DCI; and sequentially cascading the first part of feedback codebook and the second part of feedback codebook to obtain the HARQ-ACK feedback codebook.

Optionally, the generating the second part of feedback codebook based on the PDCCH detection opportunity set subsequent to the uplink DCI includes:

generating the second part of feedback codebook based on a maximum quantity of PDCCHs configured to schedule a PDSCH transmission in the PDCCH detection opportunity set subsequent to the uplink DCI; or generating the second part of feedback codebook based on a PDSCH transmission position set capable of being scheduled by downlink DCI in a PDCCH detection opportunity set subsequent to the uplink DCI.

Optionally, the generating the HARQ-ACK feedback codebook based on the PDCCH detection opportunity set subsequent to the uplink DCI includes:

generating the HARQ-ACK feedback codebook based on a maximum quantity of PDCCH configured to schedule a PDSCH transmission in the PDCCH detection opportunity set subsequent to the uplink DCI; or generating the HARQ-ACK feedback codebook based on a PDSCH transmission position set capable of being scheduled by the downlink DCI in the PDCCH detection opportunity set subsequent to the uplink DCI.

Optionally, the method further includes: when the HARQ-ACK of the PDSCH is required to be transmitted on the PUSCH scheduled by the uplink DCI in a multiplexing mode, if the uplink DCI does not include the DAI, determining the HARQ-ACK feedback codebook transmitted on the PUSCH based on the received PDSCH transmission or PDCCH transmission.

Optionally, the determining the HARQ-ACK feedback codebook transmitted on the PUSCH based on the received PDSCH transmission or PDCCH transmission if the uplink DCI does not include the DAI includes:

when the terminal is configured with a semi-static codebook, generating the HARQ-ACK feedback codebook based on the PDSCH received in a first PDSCH position set, where the first PDSCH position set is a set of all PDSCH positions where the HARQ-ACK is required to be transmitted on the PUSCH;

when the terminal is configured with a dynamic codebook, generating the HARQ-ACK feedback codebook based on the PDCCH received in a first PDCCH detection opportunity set, where the first PDCCH detection opportunity set is a set of all PDCCH detection opportunities where the HARQ-ACK is required to be transmitted on the PUSCH.

A hybrid automatic repeat request-acknowledgement (HARQ-ACK) feedback method is further provided in the present disclosure, performed by a network side device and including:

when a HARQ-ACK of a physical downlink shared channel (PDSCH) is required to be received on a physical uplink shared channel (PUSCH) scheduled by uplink downlink control information (DCI), if the uplink DCI includes a downlink assignment index (DAI), receiving an HARQ-ACK feedback codebook received on the PUSCH, based on a judgement result of whether the PDSCH scheduled before the uplink DCI is required to transmit the HARQ-ACK on the PUSCH in a multiplexing mode and a maximum quantity of PDSCHs capable of being transmitted after the uplink DCI.

Optionally, the receiving the HARQ-ACK feedback codebook received on the PUSCH based on the judgement result of whether the PDSCH scheduled before the uplink DCI is required to transmit the HARQ-ACK on the PUSCH in a multiplexing mode and the maximum quantity of PDSCHs capable of being transmitted after the uplink DCI includes:

when the terminal is configured with a semi-static codebook by the network side device, if the judgement result is that the PDSCH scheduled before the uplink DCI is required to transmit the HARQ-ACK on the PUSCH in a multiplexing mode, receiving the HARQ-ACK feedback codebook based on a set of all PDSCH positions where the HARQ-ACK is required to be transmitted on the PUSCH; and when the terminal is configured with a semi-static codebook, if the judgement result is that the PDSCH scheduled before the uplink DCI is required to transmit the HARQ-ACK on the PUSCH in a multiplexing mode, receiving the HARQ-ACK feedback codebook based on a set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is sent in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity;

where the second PDCCH detection opportunity is configured to send the uplink DCI.

Optionally, the receiving the HARQ-ACK feedback codebook received on the PUSCH, based on the judgement result of whether the PDSCH scheduled before the uplink DCI is required to transmit the HARQ-ACK on the PUSCH in a multiplexing mode and the maximum quantity of PDSCHs capable of being transmitted after the uplink DCI if the uplink DCI includes a DAI includes:

when the terminal is configured with the dynamic codebook, if the judgement result is that the PDSCH scheduled before the uplink DCI is required to transmit the HARQ-ACK on the PUSCH in a multiplexing mode, receiving the HARQ-ACK feedback codebook based on all PDCCH detection opportunity sets and the DAI; and when the terminal is configured with a dynamic codebook, if the judgement result is that the PDSCH scheduled before the uplink DCI is not required to transmit the HARQ-ACK on the PUSCH in a multiplexing mode, receiving the HARQ-ACK feedback codebook based on a PDCCH detection opportunity set subsequent to the uplink DCI.

Optionally, the receiving the HARQ-ACK feedback codebook based on all PDCCH detection opportunity sets and the DAI includes:

determining a first part of feedback codebook based on the PDCCH detection opportunity set prior to the uplink DCI and the PDCCH sent in the PDCCH detection opportunity where the uplink DCI is located and the DAI;

determining a second part of feedback codebook based on a PDCCH detection opportunity set subsequent to the uplink DCI; and obtaining a total bit number of the HARQ-ACK feedback codebook according to a bit number of the first part of feedback codebook and a bit number of the second part of feedback codebook.

Optionally, the determining the second part of feedback codebook based on the PDCCH detection opportunity set subsequent to the uplink DCI includes:

determining the bit number of the second part of feedback codebook based on a maximum quantity of PDCCHs configured to schedule a PDSCH transmission in the PDCCH detection opportunity set subsequent to the uplink DCI; or determining the bit number of the second part of feedback codebook based on a PDSCH transmission position set capable of being scheduled by downlink DCI in a PDCCH detection opportunity set subsequent to the uplink DCI.

Optionally, the receiving the HARQ-ACK feedback codebook based on the PDCCH detection opportunity set subsequent to the uplink DCI includes:

receiving the HARQ-ACK feedback codebook based on a maximum quantity of PDCCH configured to schedule a PDSCH transmission in the PDCCH detection opportunity set subsequent to the uplink DCI; or receiving the HARQ-ACK feedback codebook based on a PDSCH transmission position set capable of being scheduled by the downlink DCI in the PDCCH detection opportunity set subsequent to the uplink DCI.

Optionally, the method further includes: when the HARQ-ACK of the PDSCH is required to be receiving on the PUSCH scheduled by the uplink DCI in a multiplexing mode, if the uplink DCI does not include the DAI, receiving the HARQ-ACK feedback codebook transmitted on the PUSCH based on the sent PDSCH transmission or PDCCH transmission.

Optionally, the receiving the HARQ-ACK feedback codebook transmitted on the PUSCH based on the sent PDSCH transmission or PDCCH transmission if the uplink DCI does not include the DAI includes:

when the terminal is configured with a semi-static codebook by the network side device, receiving the HARQ-ACK feedback codebook based on the PDSCH sent in a first PDSCH position set, where the first PDSCH position set is a set of all PDSCH positions where the HARQ-ACK is required to be transmitted on the PUSCH;

when the terminal is configured with a dynamic codebook by the network side device, receiving the HARQ-ACK feedback codebook based on the PDCCH sent in a first PDCCH detection opportunity set, where the first PDCCH detection opportunity set is a set of all PDCCH detection opportunities where the HARQ-ACK is required to be transmitted on the PUSCH.

A terminal is further provided in the present disclosure, including:

a first feedback codebook determining module, configured to, when a HARQ-ACK of a physical downlink shared channel (PDSCH) is required to be transmitted on a physical uplink shared channel (PUSCH) scheduled by uplink downlink control information (DCI) in a multiplexing mode, if the uplink DCI includes a downlink assignment index (DAI), determine an HARQ-ACK feedback codebook transmitted on the PUSCH, based on at least one of a judgement result of whether the PDSCH scheduled before the uplink DCI is required to transmit the HARQ-ACK on the PUSCH in a multiplexing mode or the DAI, and a maximum quantity of PDSCHs capable of being transmitted after the uplink DCI.

Optionally, the judgement result is obtained according to the DAI in the uplink DCI, or according to the DAI in the uplink DCI and a judgement result of whether a first physical downlink control channel (PDCCH) is received in a PDCCH detection opportunity before the uplink DCI and a PDCCH detection opportunity in which the uplink DCI is located, where the first PDCCH is a PDCCH corresponding to a PDSCH transmission where an HARQ-ACK feedback is required to be performed on the PUSCH, or a PDCCH corresponding to a semi-persistent scheduling (SPS) PDSCH release.

Optionally, the first feedback codebook determining module includes:

a first feedback codebook generating submodule, configured to, when the terminal is configured with a semi-static codebook, if the judgement result is that the PDSCH scheduled before the uplink DCI is required to transmit the HARQ-ACK on the PUSCH in a multiplexing mode, generate the HARQ-ACK feedback codebook based on a set of all PDSCH positions where the HARQ-ACK is required to be transmitted on the PUSCH; and a second feedback codebook generating submodule, configured to, when the terminal is configured with a semi-static codebook, if the judgement result is that the PDSCH scheduled before the uplink DCI is not required to transmit the HARQ-ACK on the PUSCH in a multiplexing mode, generate a HARQ-ACK feedback codebook based on a set of PDSCH positions subsequent to the uplink DCI and in which the HARQ-ACK is required to be transmitted on the PUSCH.

Optionally, the set of all PDSCH positions where the HARQ-ACK is required to be transmitted on the PUSCH is determined according to at least one of HARQ-ACK feedback timing sequence, a semi-static slot structure or PDSCH candidate time domain resource allocation information;

the set of PDSCH positions subsequent to the uplink DCI and in which the HARQ-ACK is required to be transmitted on the PUSCH is:

the set of PDSCH positions subsequent to the uplink DCI, in the set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is transmitted in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity;

the second PDCCH detection opportunity is configured to transmit the uplink DCI.

Optionally, the first feedback codebook determining module includes:

a third feedback codebook generating submodule, configured to, when the terminal is configured with a dynamic codebook, if the judgement result is that the PDSCH scheduled before the uplink DCI is required to transmit the HARQ-ACK on the PUSCH in a multiplexing mode, generate the HARQ-ACK feedback codebook based on all PDCCH detection opportunity sets and the DAI;

a fourth feedback codebook generating submodule, configured to, when the terminal is configured with a dynamic codebook, if the judgement result is that the PDSCH scheduled before the uplink DCI is not required to transmit the HARQ-ACK on the PUSCH in a multiplexing mode, generate the HARQ-ACK feedback codebook based on a PDCCH detection opportunity set subsequent to the uplink DCI.

Optionally, the PDCCH detection opportunity set is determined based on a HARQ-ACK feedback timing sequence and a PDCCH-to-PDSCH scheduling slot offset value.

Optionally, the third feedback codebook generating submodule includes:

a first generating unit, configured to generate a first part of feedback codebook based on the PDCCH detection opportunity set prior to the uplink DCI and the PDCCH received in the PDCCH detection opportunity where the uplink DCI is located and the DAI;

a second generating unit, configured to generate a second part of feedback codebook based on a PDCCH detection opportunity set subsequent to the uplink DCI; and a cascading unit, configured to sequentially cascade the first part of feedback codebook and the second part of feedback codebook to obtain the HARQ-ACK feedback codebook.

Optionally, the second generating unit includes:

a first generating subunit, configured to generate the second part of feedback codebook based on a maximum quantity of PDCCHs configured to schedule a PDSCH transmission in the PDCCH detection opportunity set subsequent to the uplink DCI, a second generating subunit, configured to generate the second part of feedback codebook based on a PDSCH transmission position set capable of being scheduled by downlink DCI in a PDCCH detection opportunity set subsequent to the uplink DCI.

Optionally, the fourth feedback codebook generation submodule includes:

a third generating unit, configured to generate the HARQ-ACK feedback codebook based on a maximum quantity of PDCCH configured to schedule a PDSCH transmission in the PDCCH detection opportunity set subsequent to the uplink DCI;

a fourth generating unit, configured to generate the HARQ-ACK feedback codebook based on a PDSCH transmission position set capable of being scheduled by the downlink DCI in the PDCCH detection opportunity set subsequent to the uplink DCI.

Optionally, the terminal further includes:

a second feedback codebook determining module, configured to, when the HARQ-ACK of the PDSCH is required to be transmitted on the PUSCH scheduled by the uplink DCI in a multiplexing mode, if the uplink DCI does not include the DAI, determine the HARQ-ACK feedback codebook transmitted on the PUSCH based on the received PDSCH transmission or PDCCH transmission.

Optionally, the second feedback codebook determining module includes:

a fifth feedback codebook generating submodule, configured to, when the terminal is configured with a semi-static codebook, generate the HARQ-ACK feedback codebook based on the PDSCH received in a first PDSCH position set, where the first PDSCH position set is a set of all PDSCH positions where the HARQ-ACK is required to be transmitted on the PUSCH;

a sixth feedback codebook generating submodule, configured to, when the terminal is configured with a dynamic codebook, generate the HARQ-ACK feedback codebook based on the PDCCH received in a first PDCCH detection opportunity set, where the first PDCCH detection opportunity set is a set of all PDCCH detection opportunities where the HARQ-ACK is required to be transmitted on the PUSCH.

A network side device is further provided in the present disclosure, including:

a first feedback codebook receiving module, configured to, when a HARQ-ACK of a physical downlink shared channel (PDSCH) is required to be received on a physical uplink shared channel (PUSCH) scheduled by uplink downlink control information (DCI), if the uplink DCI includes a downlink assignment index (DAI), receive an HARQ-ACK feedback codebook received on the PUSCH, based on a judgement result of whether the PDSCH scheduled before the uplink DCI is required to transmit the HARQ-ACK on the PUSCH in a multiplexing mode and a maximum quantity of PDSCHs capable of being transmitted after the uplink DCI.

Optionally, the first feedback codebook receiving module includes:

a first feedback codebook receiving submodule, configured to, when the terminal is configured with a semi-static codebook by the network side device, if the judgement result is that the PDSCH scheduled before the uplink DCI is required to transmit the HARQ-ACK on the PUSCH in a multiplexing mode, receive the HARQ-ACK feedback codebook based on a set of all PDSCH positions where the HARQ-ACK is required to be transmitted on the PUSCH; and a second feedback codebook receiving submodule, configured to, when the terminal is configured with a semi-static codebook, if the judgement result is that the PDSCH scheduled before the uplink DCI is required to transmit the HARQ-ACK on the PUSCH in a multiplexing mode, receive the HARQ-ACK feedback codebook based on a set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is sent in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity;

the second PDCCH detection opportunity is configured to send the uplink DCI.

Optionally, the first feedback codebook receiving module includes:

a third feedback codebook receiving submodule, configured to, when the terminal is configured with the dynamic codebook, if the judgement result is that the PDSCH scheduled before the uplink DCI is required to transmit the HARQ-ACK on the PUSCH in a multiplexing mode, receive the HARQ-ACK feedback codebook based on all PDCCH detection opportunity sets and the DAI; and a fourth feedback codebook receiving submodule, configured to, when the terminal is configured with a dynamic codebook, if the judgement result is that the PDSCH scheduled before the uplink DCI is not required to transmit the HARQ-ACK on the PUSCH in a multiplexing mode, receive the HARQ-ACK feedback codebook based on a PDCCH detection opportunity set subsequent to the uplink DCI.

Optionally, the third feedback codebook receiving submodule includes:

a first determining unit, configured to determine a bit number of a first part of feedback codebook based on the PDCCH detection opportunity set prior to the uplink DCI and the PDCCH sent in the PDCCH detection opportunity where the uplink DCI is located and the DAI;

a second determining unit, configured to determine a bit number of a second part of feedback codebook based on a PDCCH detection opportunity set subsequent to the uplink DCI; and a totaling unit, configured to obtain a total bit number of the HARQ-ACK feedback codebook according to a bit number of the first part of feedback codebook and a bit number of the second part of feedback codebook.

Optionally, the second determining unit includes:

a first determining subunit, configured to determine the bit number of the second part of feedback codebook based on a maximum quantity of PDCCHs configured to schedule a PDSCH transmission in the PDCCH detection opportunity set subsequent to the uplink DCI; or a second determining subunit, configured to determine the bit number of the second part of feedback codebook based on a PDSCH transmission position set capable of being scheduled by downlink DCI in a PDCCH detection opportunity set subsequent to the uplink DCI.

Optionally, the fourth feedback codebook receiving submodule includes:

a first receiving unit, configured to receive the HARQ-ACK feedback codebook based on a maximum quantity of PDCCH configured to schedule a PDSCH transmission in the PDCCH detection opportunity set subsequent to the uplink DCI; or a second receiving unit, configured to receive the HARQ-ACK feedback codebook based on a PDSCH transmission position set capable of being scheduled by the downlink DCI in the PDCCH detection opportunity set subsequent to the uplink DCI.

Optionally, the network side device further includes:

a second feedback codebook receiving module, configured to, when the HARQ-ACK of the PDSCH is required to be receiving on the PUSCH scheduled by the uplink DCI in a multiplexing mode, if the uplink DCI does not include the DAI, receive the HARQ-ACK feedback codebook transmitted on the PUSCH based on the sent PDSCH transmission or PDCCH transmission.

Optionally, a second feedback codebook receiving module includes:

a fifth feedback codebook receiving submodule, configured to, when the terminal is configured with a semi-static codebook by the network side device, receive the HARQ-ACK feedback codebook based on the PDSCH sent in a first PDSCH position set, where the first PDSCH position set is a set of all PDSCH positions where the HARQ-ACK is required to be transmitted on the PUSCH;

a sixth feedback codebook receiving submodule, configured to, when the terminal is configured with a dynamic codebook by the network side device, receive the HARQ-ACK feedback codebook based on the PDCCH sent in a first PDCCH detection opportunity set, where the first PDCCH detection opportunity set is a set of all PDCCH detection opportunities where the HARQ-ACK is required to be transmitted on the PUSCH.

A terminal is further provided in the present disclosure, including: a memory, a processor and a computer program stored in the memory and executable on the processor, where the processor is configured to execute the computer program to perform:

when a HARQ-ACK of a physical downlink shared channel (PDSCH) is required to be transmitted on a physical uplink shared channel (PUSCH) scheduled by uplink downlink control information (DCI) in a multiplexing mode, if the uplink DCI includes a downlink assignment index (DAI), determining an HARQ-ACK feedback codebook transmitted on the PUSCH, based on at least one of a judgement result of whether the PDSCH scheduled before the uplink DCI is required to transmit the HARQ-ACK on the PUSCH in a multiplexing mode or the DAI, and a maximum quantity of PDSCHs capable of being transmitted after the uplink DCI.

Optionally, the judgement result is obtained according to the DAI in the uplink DCI, or according to the DAI in the uplink DCI and a judgement result of whether a first physical downlink control channel (PDCCH) is received in a PDCCH detection opportunity before the uplink DCI and a PDCCH detection opportunity in which the uplink DCI is located, where the first PDCCH is a PDCCH corresponding to a PDSCH transmission where an HARQ-ACK feedback is required to be performed on the PUSCH, or a PDCCH corresponding to a semi-persistent scheduling (SPS) PDSCH release.

Optionally, the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI if the uplink DCI includes the DAI includes:

when the terminal is configured with a semi-static codebook, if the judgement result is that the PDSCH scheduled before the uplink DCI is required to transmit the HARQ-ACK on the PUSCH in a multiplexing mode, generating the HARQ-ACK feedback codebook based on a set of all PDSCH positions where the HARQ-ACK is required to be transmitted on the PUSCH;

when the terminal is configured with a semi-static codebook, if the judgement result is that the PDSCH scheduled before the uplink DCI is not required to transmit the HARQ-ACK on the PUSCH in a multiplexing mode, generating a HARQ-ACK feedback codebook based on a set of PDSCH positions subsequent to the uplink DCI and in which the HARQ-ACK is required to be transmitted on the PUSCH.

Optionally, the HARQ-ACK is required to be transmitted on the PUSCH is determined according to at least one of HARQ-ACK feedback timing sequence, a semi-static slot structure or PDSCH candidate time domain resource allocation information;

the set of PDSCH positions subsequent to the uplink DCI and in which the HARQ-ACK is required to be transmitted on the PUSCH is:

the set of PDSCH positions subsequent to the uplink DCI, in the set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is transmitted in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity;

the second PDCCH detection opportunity is configured to transmit the uplink DCI.

Optionally, the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI if the uplink DCI includes the DAI includes:

when the terminal is configured with a dynamic codebook, if the judgement result is that the PDSCH scheduled before the uplink DCI is required to transmit the HARQ-ACK on the PUSCH in a multiplexing mode, generating the HARQ-ACK feedback codebook based on all PDCCH detection opportunity sets and the DAI;

when the terminal is configured with a dynamic codebook, if the judgement result is that the PDSCH scheduled before the uplink DCI is not required to transmit the HARQ-ACK on the PUSCH in a multiplexing mode, generating the HARQ-ACK feedback codebook based on a PDCCH detection opportunity set subsequent to the uplink DCI.

Optionally, the PDCCH detection opportunity set is determined based on a HARQ-ACK feedback timing sequence and a PDCCH-to-PDSCH scheduling slot offset value.

Optionally, the generating the HARQ-ACK feedback codebook based on all PDCCH detection opportunity sets and the DAI includes:

generating a first part of feedback codebook based on the PDCCH detection opportunity set prior to the uplink DCI and the PDCCH received in the PDCCH detection opportunity where the uplink DCI is located and the DAI;

generating a second part of feedback codebook based on a PDCCH detection opportunity set subsequent to the uplink DCI; and sequentially cascading the first part of feedback codebook and the second part of feedback codebook to obtain the HARQ-ACK feedback codebook.

Optionally, the generating the second part of feedback codebook based on the PDCCH detection opportunity set subsequent to the uplink DCI includes:

generating the second part of feedback codebook based on a maximum quantity of PDCCHs configured to schedule a PDSCH transmission in the PDCCH detection opportunity set subsequent to the uplink DCI; or generating the second part of feedback codebook based on a PDSCH transmission position set capable of being scheduled by downlink DCI in a PDCCH detection opportunity set subsequent to the uplink DCI.

Optionally, the generating the HARQ-ACK feedback codebook based on the PDCCH detection opportunity set subsequent to the uplink DCI includes:

generating the HARQ-ACK feedback codebook based on a maximum quantity of PDCCH configured to schedule a PDSCH transmission in the PDCCH detection opportunity set subsequent to the uplink DCI; or generating the HARQ-ACK feedback codebook based on a PDSCH transmission position set capable of being scheduled by the downlink DCI in the PDCCH detection opportunity set subsequent to the uplink DCI.

Optionally, the method further includes: when the HARQ-ACK of the PDSCH is required to be transmitted on the PUSCH scheduled by the uplink DCI in a multiplexing mode, if the uplink DCI does not include the DAI, determining the HARQ-ACK feedback codebook transmitted on the PUSCH based on the received PDSCH transmission or PDCCH transmission.

Optionally, the determining the HARQ-ACK feedback codebook transmitted on the PUSCH based on the received PDSCH transmission or PDCCH transmission if the uplink DCI does not include the DAI includes:

when the terminal is configured with a semi-static codebook, generating the HARQ-ACK feedback codebook based on the PDSCH received in a first PDSCH position set, where the first PDSCH position set is a set of all PDSCH positions where the HARQ-ACK is required to be transmitted on the PUSCH;

when the terminal is configured with a dynamic codebook, generating the HARQ-ACK feedback codebook based on the PDCCH received in a first PDCCH detection opportunity set, where the first PDCCH detection opportunity set is a set of all PDCCH detection opportunities where the HARQ-ACK is required to be transmitted on the PUSCH.

A network side device is further provided in the present disclosure, including: a memory, a processor and a computer program stored in the memory and executable on the processor, where the processor is configured to execute the computer program to perform:

when a HARQ-ACK of a physical downlink shared channel (PDSCH) is required to be received on a physical uplink shared channel (PUSCH) scheduled by uplink downlink control information (DCI), if the uplink DCI includes a downlink assignment index (DAI), receiving an HARQ-ACK feedback codebook received on the PUSCH, based on a judgement result of whether the PDSCH scheduled before the uplink DCI is required to transmit the HARQ-ACK on the PUSCH in a multiplexing mode and a maximum quantity of PDSCHs capable of being transmitted after the uplink DCI.

Optionally, the receiving the HARQ-ACK feedback codebook received on the PUSCH based on the judgement result of whether the PDSCH scheduled before the uplink DCI is required to transmit the HARQ-ACK on the PUSCH in a multiplexing mode and the maximum quantity of PDSCHs capable of being transmitted after the uplink DCI includes:

when the terminal is configured with a semi-static codebook by the network side device, if the judgement result is that the PDSCH scheduled before the uplink DCI is required to transmit the HARQ-ACK on the PUSCH in a multiplexing mode, receiving the HARQ-ACK feedback codebook based on a set of all PDSCH positions where the HARQ-ACK is required to be transmitted on the PUSCH; and when the terminal is configured with a semi-static codebook, if the judgement result is that the PDSCH scheduled before the uplink DCI is required to transmit the HARQ-ACK on the PUSCH in a multiplexing mode, receiving the HARQ-ACK feedback codebook based on a set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is sent in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity;

where the second PDCCH detection opportunity is configured to send the uplink DCI.

Optionally, the receiving the HARQ-ACK feedback codebook received on the PUSCH, based on the judgement result of whether the PDSCH scheduled before the uplink DCI is required to transmit the HARQ-ACK on the PUSCH in a multiplexing mode and the maximum quantity of PDSCHs capable of being transmitted after the uplink DCI if the uplink DCI includes a DAI includes:

when the terminal is configured with the dynamic codebook, if the judgement result is that the PDSCH scheduled before the uplink DCI is required to transmit the HARQ-ACK on the PUSCH in a multiplexing mode, receiving the HARQ-ACK feedback codebook based on all PDCCH detection opportunity sets and the DAI; and when the terminal is configured with a dynamic codebook, if the judgement result is that the PDSCH scheduled before the uplink DCI is not required to transmit the HARQ-ACK on the PUSCH in a multiplexing mode, receiving the HARQ-ACK feedback codebook based on a PDCCH detection opportunity set subsequent to the uplink DCI.

Optionally, the receiving the HARQ-ACK feedback codebook based on all PDCCH detection opportunity sets and the DAI includes:

determining a bit number of a first part of feedback codebook based on the PDCCH detection opportunity set prior to the uplink DCI and the PDCCH sent in the PDCCH detection opportunity where the uplink DCI is located and the DAI;

determining a bit number of a second part of feedback codebook based on a PDCCH detection opportunity set subsequent to the uplink DCI; and obtaining a total bit number of the HARQ-ACK feedback codebook according to a bit number of the first part of feedback codebook and a bit number of the second part of feedback codebook.

Optionally, the determining the second part of feedback codebook based on the PDCCH detection opportunity set subsequent to the uplink DCI includes:

determining the bit number of the second part of feedback codebook based on a maximum quantity of PDCCHs configured to schedule a PDSCH transmission in the PDCCH detection opportunity set subsequent to the uplink DCI; or determining the bit number of the second part of feedback codebook based on a PDSCH transmission position set capable of being scheduled by downlink DCI in a PDCCH detection opportunity set subsequent to the uplink DCI.

Optionally, the receiving the HARQ-ACK feedback codebook based on the PDCCH detection opportunity set subsequent to the uplink DCI includes:

receiving the HARQ-ACK feedback codebook based on a maximum quantity of PDCCH configured to schedule a PDSCH transmission in the PDCCH detection opportunity set subsequent to the uplink DCI; or receiving the HARQ-ACK feedback codebook based on a PDSCH transmission position set capable of being scheduled by the downlink DCI in the PDCCH detection opportunity set subsequent to the uplink DCI.

Optionally, the method further includes: when the HARQ-ACK of the PDSCH is required to be receiving on the PUSCH scheduled by the uplink DCI in a multiplexing mode, if the uplink DCI does not include the DAI, receiving the HARQ-ACK feedback codebook transmitted on the PUSCH based on the sent PDSCH transmission or PDCCH transmission.

Optionally, the receiving the HARQ-ACK feedback codebook transmitted on the PUSCH based on the sent PDSCH transmission or PDCCH transmission if the uplink DCI does not include the DAI includes:

when the terminal is configured with a semi-static codebook by the network side device, receiving the HARQ-ACK feedback codebook based on the PDSCH sent in a first PDSCH position set, where the first PDSCH position set is a set of all PDSCH positions where the HARQ-ACK is required to be transmitted on the PUSCH;

when the terminal is configured with a dynamic codebook by the network side device, receiving the HARQ-ACK feedback codebook based on the PDCCH sent in a first PDCCH detection opportunity set, where the first PDCCH detection opportunity set is a set of all PDCCH detection opportunities where the HARQ-ACK is required to be transmitted on the PUSCH.

A computer readable storage medium storing a computer program is further provided in the present disclosure, where the computer program is configured to be executed by a processor to perform the hybrid automatic repeat request-acknowledgement (HARQ-ACK) feedback method hereinabove.

According to the embodiment of the disclosure, for the PDSCH scheduled after the uplink DCI, the HARQ-ACK feedback codebook transmitted on the PUSCH is determined according to the maximum number of the PDSCH that can be transmitted after the uplink DCI, so that the network side device and the terminal have a consistent understanding of the feedback codebook, thereby reducing the transmission delay and improving the transmission performance. The embodiment of the disclosure is particularly suitable for URLLC service.

BRIEF DESCRIPTION OF THE DRAWINGS

FIG. 1 is a schematic diagram of a scheduling scenario;

FIG. 2 is a schematic diagram of a network architecture to which embodiments of the present disclosure may be applied;

FIG. 3 is a flowchart illustrating an HARQ-ACK feedback method according to a first embodiment of the present disclosure;

DETAILED DESCRIPTION

Figure 4:
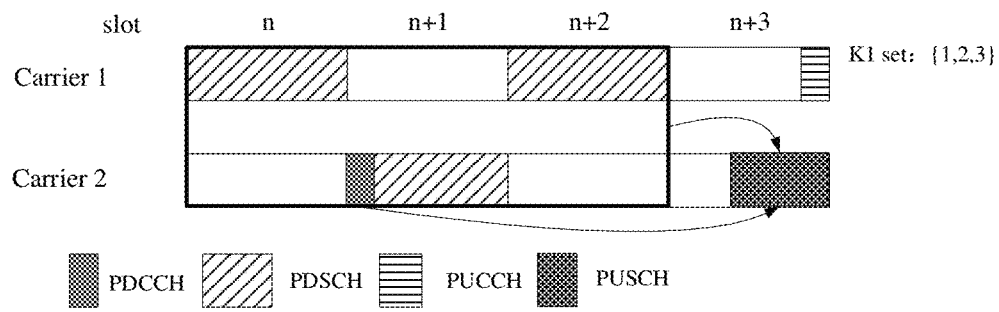
FIG. 4 is one of application scenarios of a HARQ-ACK feedback method in the embodiment of the present disclosure.

To make the technical problems, technical solutions and advantages to be solved by the present disclosure clearer, the following detailed description is made with reference to the accompanying drawings and specific embodiments.

Referring to FIG. 2, FIG. 2 is a schematic diagram of a network structure to which the embodiment of the present disclosure is applicable, and as shown in FIG. 2, the network structure includes a terminal 21 and a network side device 22, where the terminal 21 may be a User Equipment (UE) or other terminal devices, for example: terminal side devices such as a Mobile phone, a Tablet Personal Computer (Tablet Personal Computer), a Laptop Computer (Laptop Computer), a Personal Digital Assistant (PDA), a Mobile Internet Device (MID), or a Wearable Device (Wearable Device) are not limited to specific types of terminals in the embodiments of the present disclosure. The network side device 22 may be a base station, for example: macro station, Long Term Evolution (LTE) evolved node base station (eNB), 5G New Radio (NR) base station (NB), etc.; the network side device may also be a small station, such as a Low Power Node (LPN), a pico base station (pico), a femto base station (femto), or the network side device may be an Access Point (AP); the base station may also be a network node formed by a Central Unit (CU) and a plurality of Transmission Reception Points (TRPs) managed and controlled by the CU. It should be noted that, in the embodiment of the present disclosure, the specific type of the network side device is not limited.

First, a method for determining an HARQ-ACK feedback codebook in an NR communication system in the related art is briefly described, which specifically includes:

in the related art, in the NR communication system, the semi-static codebook and dynamic codebook schemes are used to support HARQ-ACK feedback.

When the terminal is configured to use the semi-static HARQ-ACK codebook, the UE first determines, according to the HARQ-ACK feedback timing sequence (K1), the semi-static timeslot structure (if configured), and the PDSCH candidate time domain resource allocation information, a PDSCH location set on each carrier c that corresponds to the same timeslot n for HARQ-ACK feedback. And then mapping the HARQ-ACK of the PDSCH received in the PDSCH position set to the corresponding position in the HARQ-ACK feedback sequence to obtain an HARQ-ACK codebook transmitted in the time slot n. Specifically, the UE determines the number of timeslots to be fed back in a timeslot on a carrier based on the HARQ feedback timing configured by the higher layer signaling, and then determines the maximum number of PDSCHs that can be transmitted in each timeslot in these timeslots. If a semi-static slot structure is configured, candidate PDSCHs that do not satisfy PDSCH transmission conditions need to be dropped based on the slot structure. When carrier aggregation exists, the HARQ-ACK code book on each carrier needs to be determined according to the process, and finally the HARQ-ACK code books of different carriers are cascaded according to the carrier sequence to obtain the final HARQ-ACK code book.

When the terminal is configured to use the dynamic HARQ-ACK codebook, determining the bit sequence and the Total bit number of the feedback based on the count DAI (Counter DAI, C-DAI) and the Total DAI (Total DAI, T-DAI) indicated by the downlink DCI. The terminal determines a PDCCH detection position set according to a pre-configured HARQ-ACK feedback time sequence candidate set and a scheduling time sequence candidate set, and assumes that C-DAI and T-DAI in DCI are set based on the PDCCH detection position set. The C-DAI indicates PDCCH indexes transmitted to a current PDCCH detection position on a current carrier for scheduling PDSCH or indicating Semi-persistent scheduling (SPS) PDSCH release according to the sequence of a frequency domain and a time domain. The T-DAI indicates the total number of PDCCHs transmitted to the current set of PDCCH detection positions to schedule PDSCH or to indicate SPS PDSCH release. The T-DAIs in the same PDCCH detection position on multiple carriers are the same. If any carrier is configured to use Code Block Group (CBG) based data transmission, two sub-codebooks are generated, the first sub-codebook is used for PDSCH transmission based on Transport Block (TB) or PDCCH indicating SPS PDSCH release, and the second sub-codebook is used for PDSCH transmission based on CBG, and the two sub-codebooks are cascaded together into a final HARQ-ACK codebook according to the order of the TB sub-codebook and the CBG sub-codebook. If a plurality of carriers are configured to use CBG-based transmission and the number of configured CBGs is different, a sub-codebook of CBGs is generated based on the maximum number of CBGs.

Then, in the 5G NR system, how to determine the HARQ-ACK feedback codebook is simply introduced when the scheduled PDSCH needs to be multiplexed and transmitted with HARQ-ACK on the PUSCH before scheduling the uplink DCI of the PUSCH.

Simultaneous transmission of the PUCCH and the PUSCH is not supported in the 5G NR system, and thus when the PUCCH and the PUSCH overlap in time, uplink control information carried by the PUCCH needs to be transferred to the PUSCH and data needs to be multiplexed and transmitted. When multiplexing transmission of HARQ-ACK on PUSCH, the corresponding HARQ-ACK codebook needs to be determined in combination with the DAI indication field in the DCI for scheduling PUSCH. Specifically, when the UE is configured to use a semi-static codebook, when the UE multiplexes HARQ-ACK on a PUSCH scheduled by DCI format 0_1 for transmission, a 1-bit DAI field is included in the DCI to indicate whether there is HARQ-ACK transmission on the scheduled PUSCH, and if the DAI field value in DCI format 0_1 is 1, the UE reuses the HARQ-ACK codebook determined for transmission on the PUSCH by the process of determining the HARQ-ACK codebook on the PUCCH according to the configuration for spatial combination of HARQ-ACKs on the PUSCH. If the DAI domain value in DCI format 0_1 for scheduling a PUSCH is 0, when the UE receives an SPS PDSCH in the set of primary carriers, or receives a PDSCH scheduled by DCI format 1_0 or a DCI format 1_0 for indicating release of the SPS PDSCH, and the DAI value in DCI format 1_0 is 1, the UE generates 1-bit HARQ-ACK only for the received one SPS PDSCH or the PDSCH scheduled by DCI format 1_0 or the DCI for indicating release of the SPS PDSCH; otherwise, the UE does not multiplex HARQ-ACK transmissions on the PUSCH. When the UE is configured to use the dynamic codebook, if the UE is configured to use single carrier transmission, only 2 bits of C-DAI indication information are contained in the scheduling PDSCH transmission or the DCI indicating the SPS PDSCH release, and no T-DAI is contained. When the UE multiplexes HARQ-ACK for transmission on the PUSCH scheduled by DCI format 0_1, a 2- or 4-bit DAI field is included in the DCI to indicate whether there is HARQ-ACK transmission on the scheduled PUSCH and the number of bits for HARQ-ACK. If the UE is not configured to use CBG-based data transmission, a 2-bit DAI is included in DCI format 0_1. If the UE is configured to use CBG-based data transmission, DCI format 0_1 includes 4-bit DAI, where 2 bits correspond to a first sub-codebook and 2 bits correspond to a second sub-codebook.

Because the DAI in the UL DCI only indicates whether PDSCH transmission is scheduled or the number of scheduled PDSCHs before the UL DCI, and cannot indicate a subsequent scheduling condition, it may cause inconsistency in understanding the feedback codebook between the base station and the terminal, thereby degrading transmission performance.

In order to solve the above problem, a HARQ-ACK feedback scheme is provided in an embodiment of the present disclosure, which is specifically referred to as the following.

Referring to FIG. 3, FIG. 3 is a flowchart of a HARQ-ACK feedback method provided in an embodiment of the present disclosure, where the method is applied to a terminal, and includes the following steps:

301. when a HARQ-ACK of a physical downlink shared channel (PDSCH) is required to be transmitted on a physical uplink shared channel (PUSCH) scheduled by uplink downlink control information (DCI) in a multiplexing mode, if the uplink DCI includes a downlink assignment index (DAI), determining by the terminal, an HARQ-ACK feedback codebook transmitted on the PUSCH, based on at least one of a judgement result of whether the PDSCH scheduled before the uplink DCI is required to transmit the HARQ-ACK on the PUSCH in a multiplexing mode or the DAI, and a maximum quantity of PDSCHs capable of being transmitted after the uplink DCI.

In the embodiment of the disclosure, for the PDSCH scheduled after the uplink DCI, the HARQ-ACK feedback codebook transmitted on the PUSCH is determined according to the maximum number of the PDSCH that can be transmitted after the uplink DCI, so that the network side device and the terminal have a consistent understanding of the feedback codebook, thereby reducing the transmission delay and improving the transmission performance. The embodiment of the disclosure is particularly suitable for URLLC service.

Optionally, the judgement result is obtained according to the DAI in the uplink DCI, or according to the DAI in the uplink DCI and a judgement result of whether a first physical downlink control channel (PDCCH) is received in a PDCCH detection opportunity before the uplink DCI and a PDCCH detection opportunity in which the uplink DCI is located, where the first PDCCH is a PDCCH corresponding to a PDSCH transmission where an HARQ-ACK feedback is required to be performed on the PUSCH, or a PDCCH corresponding to a semi-persistent scheduling (SPS) PDSCH release.

Optionally, the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI if the uplink DCI includes the DAI includes:

when the terminal is configured with a semi-static codebook, if the judgement result is that the PDSCH scheduled before the uplink DCI is required to transmit the HARQ-ACK on the PUSCH in a multiplexing mode, generating the HARQ-ACK feedback codebook based on a set of all PDSCH positions where the HARQ-ACK is required to be transmitted on the PUSCH.

For example, when the terminal is configured to use a semi-static codebook, and the DAI indicates that there is HARQ-ACK multiplexing for transmission on the PUSCH, the HARQ-ACK feedback codebook is generated based on a set of all PDSCH positions where HARQ-ACKs need to be transmitted on the PUSCH.

Specifically, HARQ-ACK of the PDSCH received in the PDSCH position set may be mapped to a corresponding position in the HARQ-ACK feedback sequence, and a position where no information is received is set as Negative Acknowledgement (NACK), so as to obtain an HARQ-ACK feedback codebook transmitted on the PUSCH.

For example, assume that the terminal is configured with two carriers (CCs), both transmit with a subcarrier spacing of 15 kHz, both transmit with a TB-based transmission, and each carrier is transmitted with a single code word, and assume that the configured set of K1 is $\{1,2,3\}$ and the configured set of K0 is $\{0,1\}$. The terminal is configured to use a semi-static codebook for HARQ-ACK feedback, DCI in a PDCCH for PUSCH transmission in scheduling slot n+3 includes a 1-bit DAI information field, and the base station indicates that the bit is 1. As shown in FIG. 4, the UE is scheduled for PDSCH transmission in time slot n and time slot n+2 of carrier 1, and time slot n+1 of carrier 2, and the DCI indicates that the corresponding HARQ-ACK is fed back in time slot n+3. The PUCCH and PUSCH resources for HARQ-ACK transmission in slot n+3 collide and therefore HARQ-ACK needs to be put on PUSCH for transmission. The terminal determines that the PDSCH transmission position fed back on the PUSCH in the time slot n+3 is located in the time slot n, the time slot n+1 and the time slot n+2 based on the K1 set $\{1,2,3\}$, and the terminal generates 6-bit HARQ-ACK feedback on the assumption that only one effective PDSCH transmission position exists in each time slot, and when the terminal correctly receives all PDSCHs, the HARQ-ACK codebook fed back on the PUSCH in the time slot n+3 is 101010.

Optionally, the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI if the uplink DCI includes the DAI includes:

when the terminal is configured with a semi-static codebook, if the judgement result is that the PDSCH scheduled before the uplink DCI is not required to transmit the HARQ-ACK on the PUSCH in a multiplexing mode, generating a HARQ-ACK feedback codebook based on a set of PDSCH positions subsequent to the uplink DCI and in which the HARQ-ACK is required to be transmitted on the PUSCH.

For example, when the terminal is configured to use a semi-static codebook and the DAI indicates that no HARQ-ACK is transmitted on the PUSCH in a multiplexing manner, the HARQ-ACK feedback codebook is generated based on a set of PDSCH positions following the uplink DCI where HARQ-ACK needs to be transmitted on the PUSCH.

Specifically, HARQ-ACK of the PDSCH received in the PDSCH location set after the uplink DCI may be mapped to a corresponding location in the HARQ-ACK feedback sequence, and a location where no information is received is set as NACK, so as to obtain the HARQ-ACK feedback codebook transmitted on the PUSCH.

In the embodiment of the present disclosure, the step of generating the HARQ-ACK feedback codebook based on the PDSCH position set that needs to transmit HARQ-ACK on the PUSCH after the uplink DCI has two specific implementation manners:

First, whether the terminal receives PDSCH transmission in the PDSCH location set after the uplink DCI or not, a corresponding feedback codebook needs to be generated. That is to say, if the terminal does not receive any PDSCH transmission scheduled by the (downlink) DCI after the uplink DCI in the PDSCH location set after the uplink DCI, a feedback codebook is still generated, and all the corresponding codebooks are NACK information.

Secondly, if the terminal receives PDSCH transmission in the PDSCH position set behind the uplink DCI, generating a corresponding feedback codebook; and if the terminal does not receive any PDSCH transmission scheduled by the (downlink) DCI after the uplink DCI in the PDSCH position set after the uplink DCI, not generating a feedback codebook.

Figure 5:
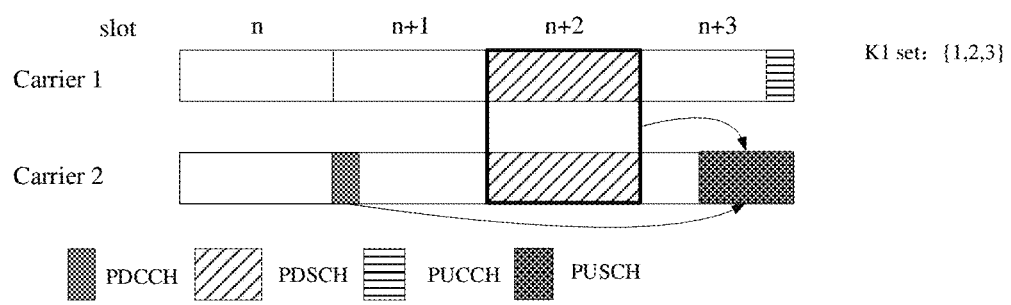
FIG. 5 is a second schematic view illustrating an application scenario of a HARQ-ACK feedback method in an embodiment of the disclosure.

For example, assume that the terminal is configured with two carriers, both of which use 15 kHz subcarrier spacing for transmission, both of which use TB-based transmission, and each of which uses single code word transmission, and that the configured set of K1 is {1,2,3} and the configured set of K0 is {0,1}. The terminal is configured to use a semi-static codebook for HARQ-ACK feedback, DCI in a PDCCH transmitted by a PUSCH in a scheduling time slot n+3 includes a 1-bit DAI information field, and the base station indicates that the bit is 0. As shown in FIG. 5, the UE is scheduled for PDSCH transmission in time slot n+2 of carrier 1 and time slot n+2 of carrier 2, and the DCI indicates that the corresponding HARQ-ACK is fed back in time slot n+3. The PUCCH and PUSCH resources for HARQ-ACK transmission in slot n+3 collide and therefore HARQ-ACK needs to be put on PUSCH for transmission. The terminal determines that the PDSCH transmission position fed back on the PUSCH after the UL DCI based on the set {1,2,3} of K1 is located in slot n+2, and assuming that there is only one effective PDSCH transmission position in each slot, the terminal generates 2-bit HARQ-ACK feedback, and when the terminal correctly receives all PDSCHs, the HARQ-ACK codebook fed back on the PUSCH in slot n+3 is 11. It should be noted that, in this example, if the base station does not schedule data transmission in the slot n+2, the terminal also needs to feed back HARQ-ACK on the PUSCH of the slot n+3, except that all the generated HARQ-ACK feedback bit sequences are NACK, and the HARQ-ACK codebook fed back by the terminal on the PUSCH in the slot n+3 is 00.

Optionally, the set of all PDSCH positions where the HARQ-ACK is required to be transmitted on the PUSCH is determined according to at least one of HARQ-ACK feedback timing sequence, a semi-static slot structure or PDSCH candidate time domain resource allocation information;

the set of PDSCH positions subsequent to the uplink DCI and in which the HARQ-ACK is required to be transmitted on the PUSCH is the set of PDSCH positions subsequent to the uplink DCI, in the set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is transmitted in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity;

where the second PDCCH detection opportunity is configured to transmit the uplink DCI.

That is, the set of PDSCH positions after the uplink DCI refers to a set of PDSCH transmission positions that can be scheduled by (downlink) DCI transmitted in a PDCCH detection opportunity after a PDCCH detection opportunity starting location where the uplink DCI is located, the PDSCH position set after the uplink DCI refers to a set of PDSCH transmission positions of which the starting positions are later than the PDCCH detection opportunity starting position where the uplink DCI is located.

In a third optional implementation manner, the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI if the uplink DCI includes the DAI includes:

when the terminal is configured with a semi-static codebook, if the judgement result is that the PDSCH scheduled before the uplink DCI is required to transmit the HARQ-ACK on the PUSCH in a multiplexing mode, generating the HARQ-ACK feedback codebook based on all PDCCH detection opportunity sets and the DAI.

For example, if the DAI indicates that HARQ-ACK multiplexing is performed on the PUSCH, or the UE receives a PDCCH or a SPS PDSCH corresponding to PDSCH transmission requiring HARQ-ACK feedback on the PUSCH and releases the corresponding PDCCH in a PDCCH detection opportunity before the uplink DCI, or the UE receives a PDCCH or a SPS PDSCH corresponding to PDSCH transmission requiring HARQ-ACK feedback on the PUSCH and releases the corresponding PDCCH in a PDCCH detection opportunity where the uplink is located, the HARQ-ACK feedback codebook is generated based on all PDCCH detection opportunity sets and the DAI.

In the embodiment of the present disclosure, the step of generating the HARQ-ACK feedback codebook based on all PDCCH detection opportunity sets and the DAI specifically has two implementation manners:

first, a feedback codebook is indicated based on the received PDCCH and UL DAI in all PDCCH detection opportunity sets. For a PDCCH detection opportunity set after UL DCI, generating corresponding feedback information if the PDCCH is received, and not generating corresponding feedback information if the PDCCH is not received;

second, generating a first part of feedback codebook based on the PDCCH detection opportunity set prior to the uplink DCI and the PDCCH received in the PDCCH detection opportunity where the uplink DCI is located and the DAI;

generating a second part of feedback codebook based on a PDCCH detection opportunity set subsequent to the uplink DCI; and sequentially cascading the first part of feedback codebook and the second part of feedback codebook to obtain the HARQ-ACK feedback codebook.

Optionally, the generating the second part of feedback codebook based on the PDCCH detection opportunity set subsequent to the uplink DCI includes:

generating the second part of feedback codebook based on a maximum quantity of PDCCHs configured to schedule a PDSCH transmission in the PDCCH detection opportunity set subsequent to the uplink DCI; or generating the second part of feedback codebook based on a PDSCH transmission position set capable of being scheduled by downlink DCI in a PDCCH detection opportunity set subsequent to the uplink DCI.

In the embodiment of the present disclosure, no matter whether the terminal receives PDCCH transmission in the PDCCH detection opportunity set after the uplink DCI, a corresponding feedback codebook needs to be generated. That is to say, if the terminal does not receive any DCI for scheduling PDSCH transmission in the PDCCH detection opportunity set after the uplink DCI, a feedback codebook is still generated, and all NACK information is included in the corresponding second part of the feedback codebook.

Figure 6:
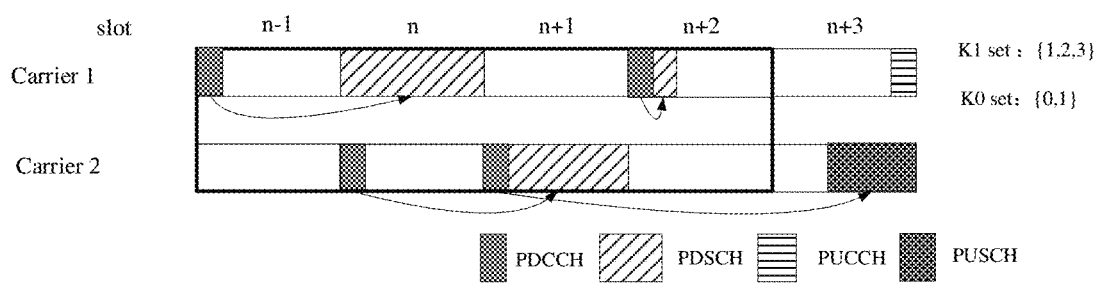
FIG. 6 is a third schematic view illustrating an application scenario of a HARQ-ACK feedback method in an embodiment of the present disclosure.

For example, assume that the terminal is configured with two carriers, both of which use 15 kHz subcarrier spacing for transmission, both of which use TB-based transmission, and each of which uses single code word transmission, and that the configured set of K1 is {1,2,3} and the configured set of K0 is {0,1}. The terminal is configured to use a dynamic codebook for HARQ-ACK feedback, DCI in a PDCCH transmitted by a PUSCH in a scheduling slot n+3 includes a 2-bit DAI information field, and the base station indicates that the two bits are 01. As shown in FIG. 6, the UE is scheduled for PDSCH transmission in time slot n and time slot n+2 of carrier 1, and time slot n+1 of carrier 2, and the DCI indicates that the corresponding HARQ-ACK is fed back in time slot n+3. The PUCCH and PUSCH resources for HARQ-ACK transmission in slot n+3 collide and therefore HARQ-ACK needs to be put on PUSCH for transmission. The terminal determines, based on the K1 set {1,2,3} and the K0 set {0,1}, that a PDCCH corresponding to PDSCH transmission for feeding back HARQ-ACK on PUSCH in slot n+3 or a PDCCH corresponding to SPS PDSCH release is located in slot n−1, slot n+1 and slot n+2, assuming that there is only one PDCCH detection opportunity in each slot of each carrier, the terminal generates a first partial feedback codebook based on PDCCH and UL DAI indications received in a set of PDCCH detection positions where UL DCI is located or before UL DCI, i.e., the terminal generates a first partial feedback codebook based on DCI detected in PDCCH detection opportunities in slot n−1, slot n and slot n+1, the first partial feedback codebook contains 2 bits of feedback information due to the base station side DAI indication being 01, corresponding to HARQ-ACK in carrier 1 slot n and carrier 2 slot n+1 PDSCH, respectively, the terminal generates a second part of feedback codebooks based on a PDCCH detection opportunity set after UL DCI, and the method specifically includes two modes:

Method I includes the following steps: a second part of feedback codebook is generated based on the maximum number of PDCCHs used for scheduling PDSCH transmission in the PDCCH detection opportunity set after UL DCI, that is, the terminal generates the second part of feedback codebook based on the PDCCH detection opportunity in the slot n+2, and assuming that PDSCH transmission is scheduled through at most 1 PDCCH in each PDCCH detection opportunity, the terminal may receive at most 2 PDCCH transmissions indicating feedback in the slot n+3 in the slot n+2 on the two carriers, so the size of the feedback codebook in the second part is 2, the terminal generates a 4-bit HARQ-ACK feedback codebook altogether, and when the terminal correctly receives all PDSCHs, the HARQ-ACK codebook fed back on the PUSCH in the slot n+3 is 1110. In this example, if the base station does not schedule data transmission in time slot n+2, one implementation manner is not to transmit the second part of the feedback codebook, and another implementation manner is that the second part of the feedback codebook always exists, but bit sequences corresponding to the second part of the feedback codebook are all NACKs, and the HARQ-ACK codebook fed back by the terminal on the PUSCH in time slot n+3 is 1100.

Method II includes the following steps: generating a second part of feedback codebook based on a set of PDSCH transmission positions that may be scheduled by a PDCCH in the set of PDCCH detection opportunities following the UL DCI, that is, the terminal generates the second part of feedback codebook based on the maximum number of PDSCH that can be scheduled by PDCCH in the PDCCH detection opportunity in the time slot n+2, assuming that there are 2 valid PDSCH transmission positions in the carrier 1 in the time slot n+2, there are 3 valid PDSCH transmission positions in the carrier 2 at most, then the terminal may receive up to 5 PDSCH transmissions fed back in time slot n+3 in time slot n+2 on both carriers, so that the feedback codebook size of the second part is 5, the terminal generates a total of 7-bit HARQ-ACK feedback codebooks, if the PDSCH received in carrier 1 slot n+2 is in the first valid PDSCH transmission position, when the terminal correctly receives all PDSCHs, the HARQ-ACK codebook fed back on PUSCH in slot n+3 is 1110000. In this example, if the base station does not schedule data transmission in slot n+2, the second part of feedback codebook always exists, but only NACK is included in the bit sequence corresponding to the second part of feedback codebook, and the HARQ-ACK codebook fed back by the terminal on the PUSCH in slot n+3 is 1100000.

In a fourth optional implementation manner, the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI if the uplink DCI includes the DAI includes:

when the terminal is configured with a dynamic codebook, if the judgement result is that the PDSCH scheduled before the uplink DCI is not required to transmit the HARQ-ACK on the PUSCH in a multiplexing mode, generating the HARQ-ACK feedback codebook based on a PDCCH detection opportunity set subsequent to the uplink DCI.

For example, if the DAI indicates that no HARQ-ACK multiplexing is transmitted on the PUSCH, and the UE does not receive any PDSCH transmission or SPS PDSCH release corresponding PDCCH indicating that HARQ-ACK feedback needs to be performed on the PUSCH before the uplink DCI and in the PDCCH detection opportunity where the uplink DCI is located, the HARQ-ACK feedback codebook is generated based on a PDCCH detection opportunity set after the uplink DCI.

Optionally, the step of generating the HARQ-ACK feedback codebook based on the PDCCH detection opportunity set after the uplink DCI includes:

generating the second part of feedback codebook based on a maximum quantity of PDCCHs configured to schedule a PDSCH transmission in the PDCCH detection opportunity set subsequent to the uplink DCI; or generating the second part of feedback codebook based on a PDSCH transmission position set capable of being scheduled by downlink DCI in a PDCCH detection opportunity set subsequent to the uplink DCI.

The step of generating the HARQ-ACK feedback codebook based on the PDCCH detection opportunity set after the uplink DCI has two specific implementation manners:

First, whether the terminal receives a PDCCH transmission in the PDCCH detection opportunity set after the uplink DCI or not, a corresponding feedback codebook needs to be generated. That is to say, if the terminal does not receive any (downlink) DCI scheduling PDSCH transmission in the PDCCH detection opportunity set after the uplink DCI, a feedback codebook is still generated, and all NACK information is corresponding to the feedback codebook.

Second, if the terminal receives PDCCH transmission in a PDCCH detection opportunity set after the uplink DCI, generating a corresponding feedback codebook; and if the terminal does not receive the PDCCH transmission in the PDCCH detection opportunity set after the uplink DCI, not generating a feedback codebook.

Figure 7:
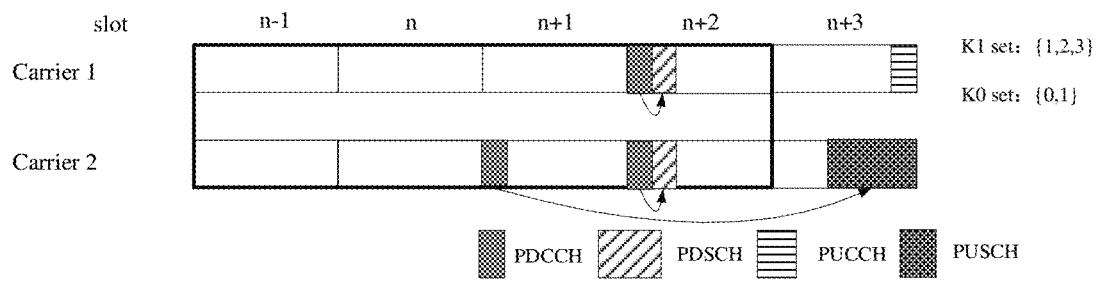
FIG. 7 is a fourth schematic view illustrating an application scenario of a HARQ-ACK feedback method in an embodiment of the present disclosure.

For example, assume that the terminal is configured with two carriers, both of which use 15 kHz subcarrier spacing for transmission, both of which use TB-based transmission, and each of which uses single code word transmission, and that the configured set of K1 is {1,2,3} and the configured set of K0 is {0,1}. The terminal is configured to use a dynamic codebook for HARQ-ACK feedback, DCI in a PDCCH for PUSCH transmission in a scheduling slot n+3 includes a 2-bit DAI information field, and the base station indicates that the two bits are 11. As shown in FIG. 7, the UE is scheduled for PDSCH transmission in time slot n+2 of carrier 1 and carrier 2, and the DCI indicates that the corresponding HARQ-ACK is fed back in time slot n+3. The PUCCH and PUSCH resources for HARQ-ACK transmission in slot n+3 collide and therefore HARQ-ACK needs to be put on PUSCH for transmission. The terminal determines that a PDCCH corresponding to PDSCH transmission for feeding back HARQ-ACK on a PUSCH in a time slot n+3 or a PDCCH corresponding to SPS PDSCH release is located in the time slot n−1, the time slot n+1 and the time slot n+2 based on a K1 set {1,2,3} and a K0 set {0,1}, and supposing that only one PDCCH detection opportunity exists in each time slot of each carrier, the terminal generates a feedback codebook based on a PDCCH detection opportunity set after UL DCI, and the method specifically includes two modes:

Method I includes the following steps: generating a feedback codebook based on the maximum number of PDCCHs used for scheduling PDSCH transmission in a PDCCH detection opportunity set after UL DCI, namely, the terminal generates the feedback codebook based on the PDCCH detection opportunity in a time slot n+2, and assuming that PDSCH transmission is scheduled through 1 PDCCH at most in each PDCCH detection opportunity, the terminal can receive 2 PDCCH transmissions indicating that the PDCCH transmissions are fed back at the time slot n+3 at most in the time slot n+2 on the two carriers, so that the size of the feedback codebook is 2, and when the terminal correctly receives all PDSCHs, the HARQ-ACK codebook fed back on the PUSCH in the time slot n+3 is 11. In this example, if the base station does not schedule data transmission in the PDCCH detection opportunity set after the UL DCI, one implementation is to not transmit a feedback codebook, and another implementation is to always have a feedback codebook on the PUSCH, and only bit sequences corresponding to the feedback codebook are all NACKs, and the HARQ-ACK codebook fed back by the terminal on the PUSCH in slot n+3 is 00.

Method II includes the following steps: generating a feedback codebook based on a set of PDSCH transmission positions that may be scheduled by a PDCCH in a set of PDCCH detection opportunities following a UL DCI, that is, the terminal generates a feedback codebook based on the maximum number of PDSCHs that can be scheduled by PDCCH in PDCCH detection opportunity in time slot n+2, assuming that there are 2 valid PDSCH transmission positions in carrier 1 in time slot n+2, 3 valid PDSCH transmission positions in carrier 2, then the terminal may receive up to 5 PDSCH transmissions fed back in time slot n+3 in time slot n+2 on both carriers, so the feedback codebook size is 5, if the PDSCH received in carrier 1 time slot n+2 is in the first active PDSCH transmission location and the PDSCH received in carrier 2 time slot n+2 is also in the first active PDSCH transmission location, then when the terminal receives all PDSCHs correctly, the HARQ-ACK codebook fed back on the PUSCH in the time slot n+3 is 10100. In this example, if the base station does not schedule data transmission in the time slot n+2, one implementation is to not transmit a feedback codebook, and another implementation is to always have a feedback codebook on the PUSCH, and only bit sequences corresponding to the feedback codebook are all NACKs, and the HARQ-ACK codebook fed back by the terminal on the PUSCH in the time slot n+3 is 00000.

Optionally, the PDCCH detection opportunity set is determined according to a HARQ-ACK feedback timing and a scheduling slot offset value from the PDCCH to the PDSCH. That is, the set of all PDCCH detection opportunities may be determined according to the HARQ-ACK feedback timing and the PDCCH-to-PDSCH scheduling slot offset value; the PDCCH detection opportunity set after the uplink DCI may also be determined according to the HARQ-ACK feedback timing and a scheduling slot offset value from the PDCCH to the PDSCH.

Specifically, the PDCCH detection opportunity after the uplink DCI refers to a PDCCH detection opportunity with a start position after the PDCCH detection opportunity start position where the uplink DCI is located, and the PDCCH detection opportunity before the uplink DCI refers to a PDCCH detection opportunity with a start position before the PDCCH detection opportunity start position where the uplink DCI is located.

In other optional embodiments, the method further includes: when the HARQ-ACK of the PDSCH needs to be transmitted on the PUSCH scheduled by the uplink DCI in a multiplexing mode, if the uplink DCI does not contain the DAI, the HARQ-ACK feedback codebook transmitted on the PUSCH is determined based on the received PDSCH transmission or PDCCH transmission.

Optionally, if the uplink DCI does not include a DAI, the step of determining, based on the received PDSCH transmission or PDCCH transmission, the HARQ-ACK feedback codebook transmitted on the PUSCH includes:

when the terminal is configured with a semi-static codebook, generating the HARQ-ACK feedback codebook based on the PDSCH received in a first PDSCH position set, where the first PDSCH position set is a set of all PDSCH positions where the HARQ-ACK is required to be transmitted on the PUSCH;

that is to say, the HARQ-ACK of the PDSCH received in the first PDSCH location set is mapped to the corresponding location in the HARQ-ACK feedback sequence, and the location where no information is received is set as NACK, so as to obtain the HARQ-ACK feedback codebook transmitted on the PUSCH. And if no PDSCH transmission needing to feed back the HARQ-ACK on the PUSCH is received, not multiplexing and transmitting the HARQ-ACK feedback information on the PUSCH.

when the terminal is configured with a dynamic codebook, generating the HARQ-ACK feedback codebook based on the PDCCH received in a first PDCCH detection opportunity set, where the first PDCCH detection opportunity set is a set of all PDCCH detection opportunities where the HARQ-ACK is required to be transmitted on the PUSCH.

If any PDCCH transmission needing to feed back the HARQ-ACK on the PUSCH is not received, the HARQ-ACK feedback information is not transmitted on the PUSCH in a multiplexing manner.

In the embodiment of the present disclosure, the UE performs effective HARQ-ACK feedback only on the PDSCH or PDCCH that the (downlink) DCI indicates to perform feedback at the current position (that is, the PUSCH) in the feedback codebook, and for the PDSCH or the corresponding PDCCH included in the current PDSCH position set or the PDCCH detection opportunity set, if the DCI indicates that the HARQ-ACK is not fed back at the current position (that is, the PUSCH), the UE generates NACK for these bits or does not generate feedback information.

Figure 8:
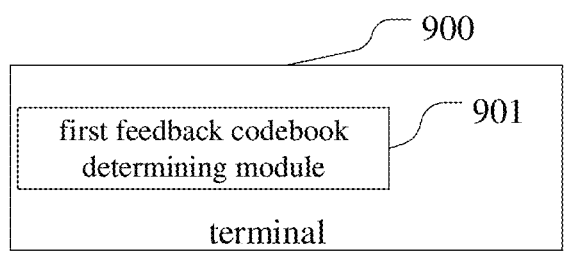
FIG. 8 is a flowchart illustrating an HARQ-ACK feedback method in a second embodiment of the present disclosure.

Referring to FIG. 8, FIG. 8 is a flowchart of another HARQ-ACK feedback method provided in the second embodiment of the present disclosure, where the method is applied to a network side device, and includes the following steps:

801. when a HARQ-ACK of a physical downlink shared channel (PDSCH) is required to be received on a physical uplink shared channel (PUSCH) scheduled by uplink downlink control information (DCI), if the uplink DCI includes a downlink assignment index (DAI), receiving an HARQ-ACK feedback codebook received on the PUSCH, based on a judgement result of whether the PDSCH scheduled before the uplink DCI is required to transmit the HARQ-ACK on the PUSCH in a multiplexing mode and a maximum quantity of PDSCHs capable of being transmitted after the uplink DCI.

For the PDSCH scheduled after the uplink DCI, determining a HARQ-ACK feedback codebook transmitted on the PUSCH according to the maximum number of the PDSCHs capable of being transmitted after the uplink DCI, so that network side device and a terminal have consistent understanding on the feedback codebook, thereby reducing transmission delay and improving transmission performance. The embodiment of the disclosure is particularly suitable for URLLC service.

Optionally, the receiving the HARQ-ACK feedback codebook received on the PUSCH based on the judgement result of whether the PDSCH scheduled before the uplink DCI is required to transmit the HARQ-ACK on the PUSCH in a multiplexing mode and the maximum quantity of PDSCHs capable of being transmitted after the uplink DCI includes:

when the terminal is configured with a semi-static codebook by the network side device, if the judgement result is that the PDSCH scheduled before the uplink DCI is required to transmit the HARQ-ACK on the PUSCH in a multiplexing mode, receiving the HARQ-ACK feedback codebook based on a set of all PDSCH positions where the HARQ-ACK is required to be transmitted on the PUSCH; and when the terminal is configured with a semi-static codebook, if the judgement result is that the PDSCH scheduled before the uplink DCI is required to transmit the HARQ-ACK on the PUSCH in a multiplexing mode, receiving the HARQ-ACK feedback codebook based on a set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is sent in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity;

the second PDCCH detection opportunity is configured to send the uplink DCI.

Optionally, the receiving the HARQ-ACK feedback codebook received on the PUSCH, based on the judgement result of whether the PDSCH scheduled before the uplink DCI is required to transmit the HARQ-ACK on the PUSCH in a multiplexing mode and the maximum quantity of PDSCHs capable of being transmitted after the uplink DCI if the uplink DCI includes a DAI includes:

when the terminal is configured with a dynamic codebook, if the judgement result is that the PDSCH scheduled before the uplink DCI is required to transmit the HARQ-ACK on the PUSCH in a multiplexing mode, receiving the HARQ-ACK feedback codebook based on all PDCCH detection opportunity sets and the DAI; and when the terminal is configured with a dynamic codebook, if the judgement result is that the PDSCH scheduled before the uplink DCI is not required to transmit the HARQ-ACK on the PUSCH in a multiplexing mode, receiving the HARQ-ACK feedback codebook based on a PDCCH detection opportunity set subsequent to the uplink DCI.

Optionally, the receiving the HARQ-ACK feedback codebook based on all PDCCH detection opportunity sets and the DAI includes:

determining a bit number of a first part of feedback codebook based on the PDCCH detection opportunity set prior to the uplink DCI and the PDCCH sent in the PDCCH detection opportunity where the uplink DCI is located and the DAI;

determining a bit number of a second part of feedback codebook based on a PDCCH detection opportunity set subsequent to the uplink DCI; and obtaining a total bit number of the HARQ-ACK feedback codebook according to a bit number of the first part of feedback codebook and a bit number of the second part of feedback codebook.

Optionally, the determining the second part of feedback codebook based on the PDCCH detection opportunity set subsequent to the uplink DCI includes:

determining the bit number of the second part of feedback codebook based on a maximum quantity of PDCCHs configured to schedule a PDSCH transmission in the PDCCH detection opportunity set subsequent to the uplink DCI; or determining the bit number of the second part of feedback codebook based on a PDSCH transmission position set capable of being scheduled by downlink DCI in a PDCCH detection opportunity set subsequent to the uplink DCI.

Optionally, the receiving the HARQ-ACK feedback codebook based on the PDCCH detection opportunity set subsequent to the uplink DCI includes:

receiving the HARQ-ACK feedback codebook based on a maximum quantity of PDCCH configured to schedule a PDSCH transmission in the PDCCH detection opportunity set subsequent to the uplink DCI; or receiving the HARQ-ACK feedback codebook based on a PDSCH transmission position set capable of being scheduled by the downlink DCI in the PDCCH detection opportunity set subsequent to the uplink DCI.

Optionally, the method further includes: when the HARQ-ACK of the PDSCH is required to be receiving on the PUSCH scheduled by the uplink DCI in a multiplexing mode, if the uplink DCI does not include the DAI, receiving the HARQ-ACK feedback codebook transmitted on the PUSCH based on the sent PDSCH transmission or PDCCH transmission.

Optionally, the receiving the HARQ-ACK feedback codebook transmitted on the PUSCH based on the sent PDSCH transmission or PDCCH transmission if the uplink DCI does not include the DAI includes:

when the terminal is configured with a semi-static codebook by the network side device, receiving the HARQ-ACK feedback codebook based on the PDSCH sent in a first PDSCH position set, where the first PDSCH position set is a set of all PDSCH positions where the HARQ-ACK is required to be transmitted on the PUSCH;

when the terminal is configured with a dynamic codebook by the network side device, receiving the HARQ-ACK feedback codebook based on the PDCCH sent in a first PDCCH detection opportunity set, where the first PDCCH detection opportunity set is a set of all PDCCH detection opportunities where the HARQ-ACK is required to be transmitted on the PUSCH.

It should be noted that, this embodiment is used as an implementation of a network side device corresponding to the foregoing method embodiment, and specific implementations thereof may refer to relevant descriptions of the foregoing method embodiment one, so that details are not repeated in this embodiment in order to avoid repeated descriptions, and the same beneficial effects may also be achieved.

Figure 9:
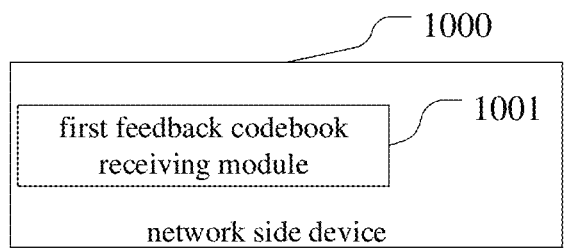
FIG. 9 is a schematic structural diagram of a terminal according to a third embodiment of the present disclosure.

Referring to FIG. 9, FIG. 9 is a structural diagram of a terminal according to a third embodiment of the present disclosure, and as shown in FIG. 9, a terminal 900 includes:

a first feedback codebook determining module 901, configured to, when a HARQ-ACK of a physical downlink shared channel (PDSCH) is required to be transmitted on a physical uplink shared channel (PUSCH) scheduled by uplink downlink control information (DCI) in a multiplexing mode, if the uplink DCI includes a downlink assignment index (DAI), determine an HARQ-ACK feedback codebook transmitted on the PUSCH, based on at least one of a judgement result of whether the PDSCH scheduled before the uplink DCI is required to transmit the HARQ-ACK on the PUSCH in a multiplexing mode or the DAI, and a maximum quantity of PDSCHs capable of being transmitted after the uplink DCI.

Optionally, the judgement result is obtained according to the DAI in the uplink DCI, or according to the DAI in the uplink DCI and a judgement result of whether a first physical downlink control channel (PDCCH) is received in a PDCCH detection opportunity before the uplink DCI and a PDCCH detection opportunity in which the uplink DCI is located, where the first PDCCH is a PDCCH corresponding to a PDSCH transmission where an HARQ-ACK feedback is required to be performed on the PUSCH, or a PDCCH corresponding to a semi-persistent scheduling (SPS) PDSCH release.

Optionally, the first feedback codebook determining module 901 includes:

a first feedback codebook generating submodule, configured to, when the terminal is configured with a semi-static codebook, if the judgement result is that the PDSCH scheduled before the uplink DCI is required to transmit the HARQ-ACK on the PUSCH in a multiplexing mode, generate the HARQ-ACK feedback codebook based on a set of all PDSCH positions where the HARQ-ACK is required to be transmitted on the PUSCH; and a second feedback codebook generating submodule, configured to, when the terminal is configured with a semi-static codebook, if the judgement result is that the PDSCH scheduled before the uplink DCI is not required to transmit the HARQ-ACK on the PUSCH in a multiplexing mode, generate a HARQ-ACK feedback codebook based on a set of PDSCH positions subsequent to the uplink DCI and in which the HARQ-ACK is required to be transmitted on the PUSCH.

Optionally, the set of all PDSCH positions where the HARQ-ACK is required to be transmitted on the PUSCH is determined according to at least one of HARQ-ACK feedback timing sequence, a semi-static slot structure or PDSCH candidate time domain resource allocation information;

the set of PDSCH positions subsequent to the uplink DCI and in which the HARQ-ACK is required to be transmitted on the PUSCH is:

the set of PDSCH positions subsequent to the uplink DCI, in the set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is transmitted in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity;

the second PDCCH detection opportunity is configured to transmit the uplink DCI.

Optionally, the first feedback codebook determining module 901 includes:

a third feedback codebook generating submodule, configured to, when the terminal is configured with a dynamic codebook, if the judgement result is that the PDSCH scheduled before the uplink DCI is required to transmit the HARQ-ACK on the PUSCH in a multiplexing mode, generate the HARQ-ACK feedback codebook based on all PDCCH detection opportunity sets and the DAI;

a fourth feedback codebook generating submodule, configured to, when the terminal is configured with a dynamic codebook, if the judgement result is that the PDSCH scheduled before the uplink DCI is not required to transmit the HARQ-ACK on the PUSCH in a multiplexing mode, generate the HARQ-ACK feedback codebook based on a PDCCH detection opportunity set subsequent to the uplink DCI.

Optionally, the PDCCH detection opportunity set is determined based on a HARQ-ACK feedback timing sequence and a PDCCH-to-PDSCH scheduling slot offset value.

Optionally, the third feedback codebook generating submodule includes:

a first generating unit, configured to generate a first part of feedback codebook based on the PDCCH detection opportunity set prior to the uplink DCI and the PDCCH received in the PDCCH detection opportunity where the uplink DCI is located and the DAI;

a second generating unit, configured to generate a second part of feedback codebook based on a PDCCH detection opportunity set subsequent to the uplink DCI; and a cascading unit, configured to sequentially cascade the first part of feedback codebook and the second part of feedback codebook to obtain the HARQ-ACK feedback codebook.

Optionally, the second generating unit includes:

a first generating subunit, configured to generate the second part of feedback codebook based on a maximum quantity of PDCCHs configured to schedule a PDSCH transmission in the PDCCH detection opportunity set subsequent to the uplink DCI, a second generating subunit, configured to generate the second part of feedback codebook based on a PDSCH transmission position set capable of being scheduled by downlink DCI in a PDCCH detection opportunity set subsequent to the uplink DCI.

Optionally, the fourth feedback codebook generation submodule includes:

a third generating unit, configured to generate the HARQ-ACK feedback codebook based on a maximum quantity of PDCCH configured to schedule a PDSCH transmission in the PDCCH detection opportunity set subsequent to the uplink DCI;

a fourth generating unit, configured to generate the HARQ-ACK feedback codebook based on a PDSCH transmission position set capable of being scheduled by the downlink DCI in the PDCCH detection opportunity set subsequent to the uplink DCI.

Optionally, the terminal further includes:

a second feedback codebook determining module, configured to, when the HARQ-ACK of the PDSCH is required to be transmitted on the PUSCH scheduled by the uplink DCI in a multiplexing mode, if the uplink DCI does not include the DAI, determine the HARQ-ACK feedback codebook transmitted on the PUSCH based on the received PDSCH transmission or PDCCH transmission.

Optionally, the second feedback codebook determining module includes:

a fifth feedback codebook generating submodule, configured to, when the terminal is configured with a semi-static codebook, generate the HARQ-ACK feedback codebook based on the PDSCH received in a first PDSCH position set, where the first PDSCH position set is a set of all PDSCH positions where the HARQ-ACK is required to be transmitted on the PUSCH;

a sixth feedback codebook generating submodule, configured to, when the terminal is configured with a dynamic codebook, generate the HARQ-ACK feedback codebook based on the PDCCH received in a first PDCCH detection opportunity set, where the first PDCCH detection opportunity set is a set of all PDCCH detection opportunities where the HARQ-ACK is required to be transmitted on the PUSCH.

It should be noted that, in this embodiment, the terminal 900 may be any implementation manner in the method embodiment in the present disclosure, and any implementation manner of the terminal in the method embodiment in the present disclosure may be implemented by the terminal 900 in this embodiment to achieve the same beneficial effect, and details are not described here again.

Figure 10:
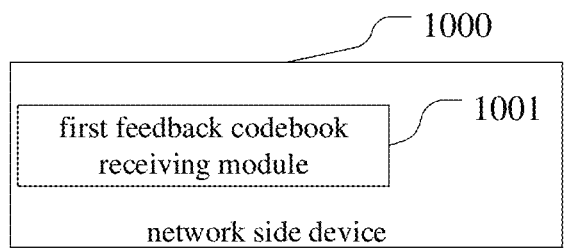
FIG. 10 is a schematic structural diagram of a network side device in a fourth embodiment of the present disclosure.

Referring to FIG. 10, FIG. 10 is a structural diagram of a network side device according to a fourth embodiment of the present disclosure, and as shown in FIG. 10, the network side device 1000 includes:

a first feedback codebook receiving module 1001, configured to, when a HARQ-ACK of a physical downlink shared channel (PDSCH) is required to be received on a physical uplink shared channel (PUSCH) scheduled by uplink downlink control information (DCI), if the uplink DCI includes a downlink assignment index (DAI), receive an HARQ-ACK feedback codebook received on the PUSCH, based on a judgement result of whether the PDSCH scheduled before the uplink DCI is required to transmit the HARQ-ACK on the PUSCH in a multiplexing mode and a maximum quantity of PDSCHs capable of being transmitted after the uplink DCI.

Optionally, the first feedback codebook receiving module 1001 includes:

a first feedback codebook receiving submodule, configured to, when the terminal is configured with a semi-static codebook by the network side device, if the judgement result is that the PDSCH scheduled before the uplink DCI is required to transmit the HARQ-ACK on the PUSCH in a multiplexing mode, receive the HARQ-ACK feedback codebook based on a set of all PDSCH positions where the HARQ-ACK is required to be transmitted on the PUSCH; and a second feedback codebook receiving submodule, configured to, when the terminal is configured with a semi-static codebook, if the judgement result is that the PDSCH scheduled before the uplink DCI is required to transmit the HARQ-ACK on the PUSCH in a multiplexing mode, receive the HARQ-ACK feedback codebook based on a set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is sent in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity;

the second PDCCH detection opportunity is configured to send the uplink DCI.

Optionally, the first feedback codebook receiving module 1001 includes:

a third feedback codebook receiving submodule, configured to, when the terminal is configured with the dynamic codebook, if the judgement result is that the PDSCH scheduled before the uplink DCI is required to transmit the HARQ-ACK on the PUSCH in a multiplexing mode, receive the HARQ-ACK feedback codebook based on all PDCCH detection opportunity sets and the DAI; and a fourth feedback codebook receiving submodule, configured to, when the terminal is configured with a dynamic codebook, if the judgement result is that the PDSCH scheduled before the uplink DCI is not required to transmit the HARQ-ACK on the PUSCH in a multiplexing mode, receive the HARQ-ACK feedback codebook based on a PDCCH detection opportunity set subsequent to the uplink DCI.

Optionally, the third feedback codebook receiving submodule includes:

a first determining unit, configured to determine a bit number of a first part of feedback codebook based on the PDCCH detection opportunity set prior to the uplink DCI and the PDCCH sent in the PDCCH detection opportunity where the uplink DCI is located and the DAI;

a second determining unit, configured to determine a bit number of a second part of feedback codebook based on a PDCCH detection opportunity set subsequent to the uplink DCI; and a totaling unit, configured to obtain a total bit number of the HARQ-ACK feedback codebook according to a bit number of the first part of feedback codebook and a bit number of the second part of feedback codebook.

Optionally, the second determining unit includes:

a first determining subunit, configured to determine the bit number of the second part of feedback codebook based on a maximum quantity of PDCCHs configured to schedule a PDSCH transmission in the PDCCH detection opportunity set subsequent to the uplink DCI; or a second determining subunit, configured to determine the bit number of the second part of feedback codebook based on a PDSCH transmission position set capable of being scheduled by downlink DCI in a PDCCH detection opportunity set subsequent to the uplink DCI.

Optionally, the fourth feedback codebook receiving submodule includes:

a first receiving unit, configured to receive the HARQ-ACK feedback codebook based on a maximum quantity of PDCCH configured to schedule a PDSCH transmission in the PDCCH detection opportunity set subsequent to the uplink DCI; or a second receiving unit, configured to receive the HARQ-ACK feedback codebook based on a PDSCH transmission position set capable of being scheduled by the downlink DCI in the PDCCH detection opportunity set subsequent to the uplink DCI.

Optionally, the network side device further includes:

a second feedback codebook receiving module, configured to, when the HARQ-ACK of the PDSCH is required to be receiving on the PUSCH scheduled by the uplink DCI in a multiplexing mode, if the uplink DCI does not include the DAI, receive the HARQ-ACK feedback codebook transmitted on the PUSCH based on the sent PDSCH transmission or PDCCH transmission.

Optionally, a second feedback codebook receiving module includes:

a fifth feedback codebook receiving submodule, configured to, when the terminal is configured with a semi-static codebook by the network side device, receive the HARQ-ACK feedback codebook based on the PDSCH sent in a first PDSCH position set, where the first PDSCH position set is a set of all PDSCH positions where the HARQ-ACK is required to be transmitted on the PUSCH;

a sixth feedback codebook receiving submodule, configured to, when the terminal is configured with a dynamic codebook by the network side device, receive the HARQ-ACK feedback codebook based on the PDCCH sent in a first PDCCH detection opportunity set, where the first PDCCH detection opportunity set is a set of all PDCCH detection opportunities where the HARQ-ACK is required to be transmitted on the PUSCH.

It should be noted that, in this embodiment, the network side device 1000 may be a network side device according to any implementation manner in the method embodiment in the present disclosure, and any implementation manner of the network side device in the method embodiment in the present disclosure may be implemented by the network side device 1000 in this embodiment to achieve the same beneficial effect, which is not described herein again.

Figure 11:
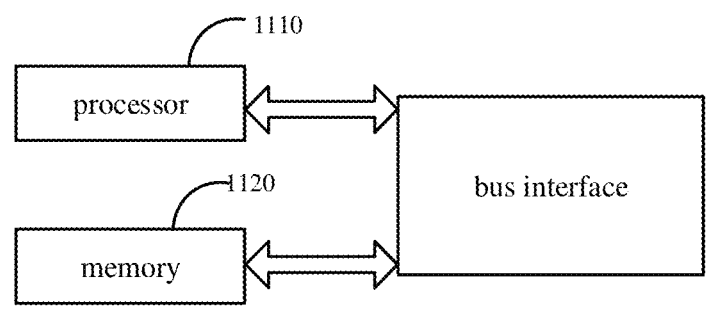
FIG. 11 is a schematic structural diagram of a terminal according to a fifth embodiment of the present disclosure.

Referring to FIG. 11, FIG. 11 is a structural diagram of another terminal provided in a fifth embodiment of the present disclosure, and as shown in FIG. 11, the terminal includes: a memory 1120, a processor 1110 and a computer program stored in the memory 1120 and executable on the processor 1110, where the processor 1110 is configured to execute the computer program to perform:

when a HARQ-ACK of a physical downlink shared channel (PDSCH) is required to be transmitted on a physical uplink shared channel (PUSCH) scheduled by uplink downlink control information (DCI) in a multiplexing mode, if the uplink DCI includes a downlink assignment index (DAI), determining an HARQ-ACK feedback codebook transmitted on the PUSCH, based on at least one of a judgement result of whether the PDSCH scheduled before the uplink DCI is required to transmit the HARQ-ACK on the PUSCH in a multiplexing mode or the DAI, and a maximum quantity of PDSCHs capable of being transmitted after the uplink DCI.

In FIG. 11, the bus architecture may include any number of interconnected buses and bridges, with various circuits being linked together, in particular, one or more processors, represented by a processor 1110, and a memory, represented by a memory 1120. The bus architecture may also link together various other circuits such as peripherals, voltage regulators, power management circuits, and the like, which are well known in the art, and therefore, will not be described any further herein. The bus interface provides an interface.

The processor 1110 is responsible for managing the bus architecture and general processing, and the memory 1120 may store data used by the processor 1110 in performing operations.

It is to be understood that the memory 1120 is not limited to being implemented on a terminal, and the memory 1120 and the processor 1110 may be separated and located in different geographical positions.

Optionally, the judgement result is obtained according to the DAI in the uplink DCI, or according to the DAI in the uplink DCI and a judgement result of whether a first physical downlink control channel (PDCCH) is received in a PDCCH detection opportunity before the uplink DCI and a PDCCH detection opportunity in which the uplink DCI is located, where the first PDCCH is a PDCCH corresponding to a PDSCH transmission where an HARQ-ACK feedback is required to be performed on the PUSCH, or a PDCCH corresponding to a semi-persistent scheduling (SPS) PDSCH release.

Optionally, the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI if the uplink DCI includes the DAI includes:

when the terminal is configured with a semi-static codebook, if the judgement result is that the PDSCH scheduled before the uplink DCI is required to transmit the HARQ-ACK on the PUSCH in a multiplexing mode, generating the HARQ-ACK feedback codebook based on a set of all PDSCH positions where the HARQ-ACK is required to be transmitted on the PUSCH;

when the terminal is configured with a semi-static codebook, if the judgement result is that the PDSCH scheduled before the uplink DCI is not required to transmit the HARQ-ACK on the PUSCH in a multiplexing mode, generating a HARQ-ACK feedback codebook based on a set of PDSCH positions subsequent to the uplink DCI and in which the HARQ-ACK is required to be transmitted on the PUSCH.

Optionally, the HARQ-ACK is required to be transmitted on the PUSCH is determined according to at least one of HARQ-ACK feedback timing sequence, a semi-static slot structure or PDSCH candidate time domain resource allocation information;

the set of PDSCH positions subsequent to the uplink DCI and in which the HARQ-ACK is required to be transmitted on the PUSCH is:

the set of PDSCH positions subsequent to the uplink DCI, in the set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is transmitted in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity;

the second PDCCH detection opportunity is configured to transmit the uplink DCI.

Optionally, the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI if the uplink DCI includes the DAI includes:

when the terminal is configured with a dynamic codebook, if the judgement result is that the PDSCH scheduled before the uplink DCI is required to transmit the HARQ-ACK on the PUSCH in a multiplexing mode, generating the HARQ-ACK feedback codebook based on all PDCCH detection opportunity sets and the DAI;

when the terminal is configured with a dynamic codebook, if the judgement result is that the PDSCH scheduled before the uplink DCI is not required to transmit the HARQ-ACK on the PUSCH in a multiplexing mode, generating the HARQ-ACK feedback codebook based on a PDCCH detection opportunity set subsequent to the uplink DCI.

Optionally, the PDCCH detection opportunity set is determined based on a HARQ-ACK feedback timing sequence and a PDCCH-to-PDSCH scheduling slot offset value.

Optionally, the generating the HARQ-ACK feedback codebook based on all PDCCH detection opportunity sets and the DAI includes:

generating a first part of feedback codebook based on the PDCCH detection opportunity set prior to the uplink DCI and the PDCCH received in the PDCCH detection opportunity where the uplink DCI is located and the DAI;

generating a second part of feedback codebook based on a PDCCH detection opportunity set subsequent to the uplink DCI; and sequentially cascading the first part of feedback codebook and the second part of feedback codebook to obtain the HARQ-ACK feedback codebook.

Optionally, the generating the second part of feedback codebook based on the PDCCH detection opportunity set subsequent to the uplink DCI includes:

generating the second part of feedback codebook based on a maximum quantity of PDCCHs configured to schedule a PDSCH transmission in the PDCCH detection opportunity set subsequent to the uplink DCI; or generating the second part of feedback codebook based on a PDSCH transmission position set capable of being scheduled by downlink DCI in a PDCCH detection opportunity set subsequent to the uplink DCI.

Optionally, the generating the HARQ-ACK feedback codebook based on the PDCCH detection opportunity set subsequent to the uplink DCI includes:

generating the HARQ-ACK feedback codebook based on a maximum quantity of PDCCH configured to schedule a PDSCH transmission in the PDCCH detection opportunity set subsequent to the uplink DCI; or generating the HARQ-ACK feedback codebook based on a PDSCH transmission position set capable of being scheduled by the downlink DCI in the PDCCH detection opportunity set subsequent to the uplink DCI.

Optionally, the method further includes: when the HARQ-ACK of the PDSCH is required to be transmitted on the PUSCH scheduled by the uplink DCI in a multiplexing mode, if the uplink DCI does not include the DAI, determining the HARQ-ACK feedback codebook transmitted on the PUSCH based on the received PDSCH transmission or PDCCH transmission.

Optionally, the determining the HARQ-ACK feedback codebook transmitted on the PUSCH based on the received PDSCH transmission or PDCCH transmission if the uplink DCI does not include the DAI includes:

when the terminal is configured with a semi-static codebook, generating the HARQ-ACK feedback codebook based on the PDSCH received in a first PDSCH position set, where the first PDSCH position set is a set of all PDSCH positions where the HARQ-ACK is required to be transmitted on the PUSCH;

when the terminal is configured with a dynamic codebook, generating the HARQ-ACK feedback codebook based on the PDCCH received in a first PDCCH detection opportunity set, where the first PDCCH detection opportunity set is a set of all PDCCH detection opportunities where the HARQ-ACK is required to be transmitted on the PUSCH.

It should be noted that, the terminal in this embodiment may be a terminal in any implementation manner in the method embodiment in the embodiment of the present disclosure, and any implementation manner of the terminal in the method embodiment in the embodiment of the present disclosure may be implemented by the terminal in this embodiment to achieve the same beneficial effect, and details are not described here again.

Figure 12:
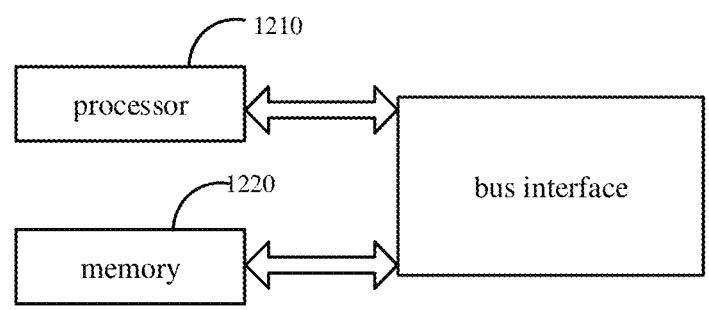
FIG. 12 is a schematic structural diagram of a network side device in a sixth embodiment of the present disclosure.

Referring to FIG. 12, FIG. 12 is a structural diagram of another network side device according to a sixth embodiment of the present disclosure, and as shown in FIG. 12, the network side device includes: a memory 1220, a processor 1210, and a computer program stored in the memory 1220 and operable on the processor 1210, where the processor 1210 implements the following steps when executing the computer program:

when a HARQ-ACK of a physical downlink shared channel (PDSCH) is required to be received on a physical uplink shared channel (PUSCH) scheduled by uplink downlink control information (DCI), if the uplink DCI includes a downlink assignment index (DAI), receiving an HARQ-ACK feedback codebook received on the PUSCH, based on a judgement result of whether the PDSCH scheduled before the uplink DCI is required to transmit the HARQ-ACK on the PUSCH in a multiplexing mode and a maximum quantity of PDSCHs capable of being transmitted after the uplink DCI.

In FIG. 12, the bus architecture may include any number of interconnected buses and bridges, with various circuits representing one or more processors, in particular processor 1210, and memory, in particular memory 1220. The bus architecture may also link together various other circuits such as peripherals, voltage regulators, power management circuits, and the like, which are well known in the art, and therefore, will not be described any further herein. The bus interface provides an interface.

The processor 1210 is responsible for managing the bus architecture and general processing, and the memory 1220 may store data used by the processor 1210 in performing operations.

It should be noted that the memory 1220 is not limited to be on a network side device, and the memory 1220 and the processor 1210 may be separated and located in different geographical positions.

Optionally, the receiving the HARQ-ACK feedback codebook received on the PUSCH based on the judgement result of whether the PDSCH scheduled before the uplink DCI is required to transmit the HARQ-ACK on the PUSCH in a multiplexing mode and the maximum quantity of PDSCHs capable of being transmitted after the uplink DCI includes:

when the terminal is configured with a semi-static codebook by the network side device, if the judgement result is that the PDSCH scheduled before the uplink DCI is required to transmit the HARQ-ACK on the PUSCH in a multiplexing mode, receiving the HARQ-ACK feedback codebook based on a set of all PDSCH positions where the HARQ-ACK is required to be transmitted on the PUSCH; and when the terminal is configured with a semi-static codebook, if the judgement result is that the PDSCH scheduled before the uplink DCI is required to transmit the HARQ-ACK on the PUSCH in a multiplexing mode, receiving the HARQ-ACK feedback codebook based on a set of all PDSCH positions where the HARQ-ACK is required to be transmitted on the PUSCH.

Optionally, the set of PDSCH positions subsequent to the uplink DCI is a set of PDSCH positions capable of being scheduled by a first downlink DCI, the first downlink DCI is sent in a first PDCCH detection opportunity, a starting positon of the first PDCCH detection opportunity is subsequent to a second PDCCH detection opportunity; or the set of the PDSCH positions subsequent to the uplink DCI is a set of PDSCH positions of which starting positions are subsequent to a second PDCCH detection opportunity; where the second PDCCH detection opportunity is configured to send the uplink DCI.

Optionally, the receiving the HARQ-ACK feedback codebook received on the PUSCH, based on the judgement result of whether the PDSCH scheduled before the uplink DCI is required to transmit the HARQ-ACK on the PUSCH in a multiplexing mode and the maximum quantity of PDSCHs capable of being transmitted after the uplink DCI if the uplink DCI includes a DAI includes:

when the terminal is configured with the dynamic codebook, if the judgement result is that the PDSCH scheduled before the uplink DCI is required to transmit the HARQ-ACK on the PUSCH in a multiplexing mode, receiving the HARQ-ACK feedback codebook based on all PDCCH detection opportunity sets and the DAI; and when the terminal is configured with a dynamic codebook, if the judgement result is that the PDSCH scheduled before the uplink DCI is not required to transmit the HARQ-ACK on the PUSCH in a multiplexing mode, receiving the HARQ-ACK feedback codebook based on a PDCCH detection opportunity set subsequent to the uplink DCI.

Optionally, the receiving the HARQ-ACK feedback codebook based on all PDCCH detection opportunity sets and the DAI includes:

determining a bit number of a first part of feedback codebook based on the PDCCH detection opportunity set prior to the uplink DCI and the PDCCH sent in the PDCCH detection opportunity where the uplink DCI is located and the DAI;

determining a bit number of a second part of feedback codebook based on a PDCCH detection opportunity set subsequent to the uplink DCI; and obtaining a total bit number of the HARQ-ACK feedback codebook according to a bit number of the first part of feedback codebook and a bit number of the second part of feedback codebook.

Optionally, the determining the second part of feedback codebook based on the PDCCH detection opportunity set subsequent to the uplink DCI includes:

determining the bit number of the second part of feedback codebook based on a maximum quantity of PDCCHs configured to schedule a PDSCH transmission in the PDCCH detection opportunity set subsequent to the uplink DCI; or determining the bit number of the second part of feedback codebook based on a PDSCH transmission position set capable of being scheduled by downlink DCI in a PDCCH detection opportunity set subsequent to the uplink DCI.

Optionally, the receiving the HARQ-ACK feedback codebook based on the PDCCH detection opportunity set subsequent to the uplink DCI includes:

receiving the HARQ-ACK feedback codebook based on a maximum quantity of PDCCH configured to schedule a PDSCH transmission in the PDCCH detection opportunity set subsequent to the uplink DCI; or receiving the HARQ-ACK feedback codebook based on a PDSCH transmission position set capable of being scheduled by the downlink DCI in the PDCCH detection opportunity set subsequent to the uplink DCI.

Optionally, the method further includes: when the HARQ-ACK of the PDSCH is required to be receiving on the PUSCH scheduled by the uplink DCI in a multiplexing mode, if the uplink DCI does not include the DAI, receiving the HARQ-ACK feedback codebook transmitted on the PUSCH based on the sent PDSCH transmission or PDCCH transmission.

Optionally, the receiving the HARQ-ACK feedback codebook transmitted on the PUSCH based on the sent PDSCH transmission or PDCCH transmission if the uplink DCI does not include the DAI includes:

when the terminal is configured with a semi-static codebook by the network side device, receiving the HARQ-ACK feedback codebook based on the PDSCH sent in a first PDSCH position set, where the first PDSCH position set is a set of all PDSCH positions where the HARQ-ACK is required to be transmitted on the PUSCH;

when the terminal is configured with a dynamic codebook by the network side device, receiving the HARQ-ACK feedback codebook based on the PDCCH sent in a first PDCCH detection opportunity set, where the first PDCCH detection opportunity set is a set of all PDCCH detection opportunities where the HARQ-ACK is required to be transmitted on the PUSCH.

It should be noted that, in this embodiment, the network side device may be a network side device in any implementation manner in the method embodiment in the present disclosure, and any implementation manner of the network side device in the method embodiment in the present disclosure may be implemented by the network side device in this embodiment to achieve the same beneficial effect, which is not described herein again.

The embodiments of the present disclosure also provide a computer-readable storage medium, on which a computer program is stored, where the computer program, when executed by a processor, implements the steps in the HARQ-ACK feedback method on the terminal side provided in the embodiments of the present disclosure, or the program, when executed by the processor, implements the steps in the HARQ-ACK feedback method on the network side device side provided in the embodiments of the present disclosure.

In the several embodiments provided in the present application, it should be understood that the disclosed method and apparatus may be implemented in other manners. For example, the above-described apparatus embodiments are merely illustrative, and for example, the division of the units is only one type of logical functional division, and other divisions may be realized in practice, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

In addition, functional units in the embodiments of the present disclosure may be integrated into one processing unit, or each unit may be separately and physically included, or two or more units may be integrated into one unit. The integrated unit may be implemented in the form of hardware, or in the form of hardware plus a software functional unit.

The integrated unit implemented in the form of a software functional unit may be stored in a computer-readable storage medium. The software functional unit is stored in a storage medium and includes several instructions to enable a computer device (which may be a personal computer, a server, or a network device, etc.) to execute some steps of the method for processing the information data block according to various embodiments of the present disclosure. And the aforementioned storage medium includes: a U-disk, a removable hard disk, a Read-Only Memory (ROM), a Random Access Memory (RAM), a magnetic disk, an optical disk, or other various media capable of storing program codes.

Those of ordinary skill in the art will appreciate that the various illustrative elements and algorithm steps described in connection with the embodiments disclosed herein may be implemented as electronic hardware, or combinations of computer software and electronic hardware. Whether such functionality is implemented as hardware or software depends upon the particular application and design constraints imposed on the technical solution. Skilled artisans may implement the described functionality in varying ways for each particular application, but such implementation decisions should not be interpreted as causing a departure from the scope of the present disclosure.

It can be clearly understood by those skilled in the art that, for convenience and simplicity of description, the specific working processes of the above-described systems, apparatuses and units may refer to the corresponding processes in the foregoing method embodiments, and are not described herein again.

In the embodiments provided in the present application, it should be understood that the disclosed apparatus and method may be implemented in other ways. For example, the above-described apparatus embodiments are merely illustrative, and for example, the division of the units is only one type of logical functional division, and other divisions may be realized in practice, for example, multiple units or components may be combined or integrated into another system, or some features may be omitted, or not executed. In addition, the shown or discussed mutual coupling or direct coupling or communication connection may be an indirect coupling or communication connection through some interfaces, devices or units, and may be in an electrical, mechanical or other form.

The units described as separate parts may or may not be physically separate, and parts displayed as units may or may not be physical units, may be located in one position, or may be distributed on multiple network units. Some or all of the units can be selected according to actual needs to achieve the purpose of the solution of the embodiment.

In addition, functional units in the embodiments of the present disclosure may be integrated into one processing unit, or each unit may exist alone physically, or two or more units are integrated into one unit.

The functions may be stored in a computer-readable storage medium if they are implemented in the form of software functional units and sold or used as separate products. Based on such understanding, the technical solutions of the present disclosure may be substantially or partially embodied in the form of a software product stored in a storage medium and including instructions for causing a computer device (which may be a personal computer, a server, or a network device) to perform all or part of the steps of the methods according to the embodiments of the present disclosure. And the aforementioned storage medium includes: a U disk, a removable hard disk, a ROM, a RAM, a magnetic disk or an optical disk, and various media capable of storing program codes.

It will be understood by those skilled in the art that all or part of the processes of the methods of the embodiments described above may be implemented by controlling related hardware through a computer program, where the computer program may be stored in a computer-readable storage medium, and when executed, the computer program may include the processes of the embodiments of the methods described above. The storage medium may be a magnetic disk, an optical disk, a Read-Only Memory (ROM), a Random Access Memory (RAM), or the like.

It is to be understood that the embodiments described in connection with the embodiments of the present disclosure may be implemented in hardware, software, firmware, middleware, microcode, or a combination thereof. For a hardware implementation, the modules, units, and sub-units may be implemented in one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose processors, controllers, micro-controllers, microprocessors, other electronic units designed to perform the functions described in this disclosure, or a combination thereof.

For a software implementation, the techniques described in the embodiments of the present disclosure may be implemented with modules (e.g., procedures, functions, and so on) that perform the functions described in the embodiments of the present disclosure. The software codes may be stored in a memory and executed by a processor. The memory may be implemented within the processor or external to the processor.

While the foregoing is directed to alternative embodiments of the present disclosure, it will be appreciated by those skilled in the art that various changes and modifications may be made therein without departing from the principles of the disclosure, and it is intended that such changes and modifications be covered by the scope of the disclosure.

What is claimed is:

1. A hybrid automatic repeat request-acknowledgement (HARQ-ACK) feedback method, performed by a terminal and comprising:
when a HARQ-ACK of a physical downlink shared channel (PDSCH) is required to be transmitted on a physical uplink shared channel (PUSCH) scheduled by uplink downlink control information (DCI) in a multiplexing mode, on determining that the uplink DCI comprises a downlink assignment index (DAI), determining an HARQ-ACK feedback codebook transmitted on the PUSCH, based on a maximum quantity of PDSCHs capable of being transmitted after the uplink DCI and at least one of the DAI or a judgement result of whether the PDSCH scheduled before the uplink DCI is required to transmit the HARQ-ACK on the PUSCH in a multiplexing mode;
and,
when the HARQ-ACK of the PDSCH is required to be transmitted on the PUSCH scheduled by the uplink DCI in a multiplexing mode, on determining that the uplink DCI does not include the DAI, determining the HARQ-ACK feedback codebook transmitted on the PUSCH based on the received PDSCH transmission or PDCCH transmission, wherein the determining the HARQ-ACK feedback codebook transmitted on the PUSCH based on the received PDSCH transmission or PDCCH transmission on determining that the uplink DCI does not include the DAI comprises:
when the terminal is configured with a semi-static codebook, generating the HARQ-ACK feedback codebook based on the PDSCH received in a first PDSCH position set, wherein the first PDSCH position set is a set of all PDSCH positions where the HARQ-ACK is required to be transmitted on the PUSCH;
when the terminal is configured with a dynamic codebook, generating the HARQ-ACK feedback codebook based on the PDCCH received in a first PDCCH detection opportunity set, wherein the first PDCCH detection opportunity set is a set of all PDCCH detection opportunities where the HARQ-ACK is required to be transmitted on the PUSCH.

2. The method according to claim 1, wherein the judgement result is obtained according to the DAI in the uplink DCI, or according to the DAI in the uplink DCI and a judgement result of whether a first physical downlink control channel (PDCCH) is received in a PDCCH detection opportunity before the uplink DCI and a PDCCH detection opportunity in which the uplink DCI is located, wherein the first PDCCH is a PDCCH corresponding to a PDSCH transmission where an HARQ-ACK feedback is required to be performed on the PUSCH, or a PDCCH corresponding to a semi-persistent scheduling (SPS) PDSCH release.

3. The method according to claim 1, wherein the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI on determining that the uplink DCI comprises the DAI comprises:
when the terminal is configured with a semi-static codebook, on determining that the judgement result is that the PDSCH scheduled before the uplink DCI is required to transmit the HARQ-ACK on the PUSCH in a multiplexing mode, generating the HARQ-ACK feedback codebook based on a set of all PDSCH positions where the HARQ-ACK is required to be transmitted on the PUSCH;
when the terminal is configured with a semi-static codebook, on determining that the judgement result is that the PDSCH scheduled before the uplink DCI is not required to transmit the HARQ-ACK on the PUSCH in a multiplexing mode, generating a HARQ-ACK feedback codebook based on a set of PDSCH positions subsequent to the uplink DCI and in which the HARQ-ACK is required to be transmitted on the PUSCH.

4. The method according to claim 3, wherein the set of all PDSCH positions where the HARQ-ACK is required to be transmitted on the PUSCH is determined according to at least one of HARQ-ACK feedback timing sequence, a semi-static slot structure or PDSCH candidate time domain resource allocation information;
the set of PDSCH positions subsequent to the uplink DCI and in which the HARQ-ACK is required to be transmitted on the PUSCH is:
the set of PDSCH positions subsequent to the uplink DCI, in the set of all PDSCH positions where the HARQ-ACK is required to be transmitted on the PUSCH.

5. The method according to claim 3, wherein
the set of PDSCH positions subsequent to the uplink DCI is a set of PDSCH positions capable of being scheduled by a first downlink DCI, the first downlink DCI is transmitted in a first PDCCH detection opportunity, a starting positon of the first PDCCH detection opportunity is subsequent to a second PDCCH detection opportunity; or
the set of the PDSCH positions subsequent to the uplink DCI is a set of PDSCH positions of which starting positions are subsequent to a second PDCCH detection opportunity;
wherein the second PDCCH detection opportunity is configured to transmit the uplink DCI.

6. The method according to claim 1, wherein the determining the HARQ-ACK feedback codebook transmitted on the PUSCH based on at least one of the judgement result of whether the PDSCH scheduled before the uplink DCI is required to transmit the HARQ-ACK on the PUSCH in a multiplexing mode or the DAI and the maximum quantity of PDSCHs capable of being transmitted after the uplink DCI on determining that the uplink DCI comprises the DAI comprises:
when the terminal is configured with a dynamic codebook, on determining that the judgement result is that the PDSCH scheduled before the uplink DCI is required to transmit the HARQ-ACK on the PUSCH in a multiplexing mode, generating the HARQ-ACK feedback codebook based on all PDCCH detection opportunity sets and the DAI;
when the terminal is configured with a dynamic codebook, on determining that the judgement result is that the PDSCH scheduled before the uplink DCI is not required to transmit the HARQ-ACK on the PUSCH in a multiplexing mode, generating the HARQ-ACK feedback codebook based on a PDCCH detection opportunity set subsequent to the uplink DCI.

7. The method according to claim 6, wherein the PDCCH detection opportunity set is determined based on a HARQ-ACK feedback timing sequence and a PDCCH-to-PDSCH scheduling slot offset value.

8. The method according to claim 6, wherein the generating the HARQ-ACK feedback codebook based on all PDCCH detection opportunity sets and the DAI comprises:
    generating a first part of feedback codebook based on the PDCCH detection opportunity set prior to the uplink DCI and the PDCCH received in the PDCCH detection opportunity where the uplink DCI is located and the DAI;
    generating a second part of feedback codebook based on a PDCCH detection opportunity set subsequent to the uplink DCI; and
    sequentially cascading the first part of feedback codebook and the second part of feedback codebook to obtain the HARQ-ACK feedback codebook.

9. The method according to claim 8, wherein the generating the second part of feedback codebook based on the PDCCH detection opportunity set subsequent to the uplink DCI comprises:
    generating the second part of feedback codebook based on a maximum quantity of PDCCHs configured to schedule a PDSCH transmission in the PDCCH detection opportunity set subsequent to the uplink DCI; or
    generating the second part of feedback codebook based on a PDSCH transmission position set capable of being scheduled by downlink DCI in a PDCCH detection opportunity set subsequent to the uplink DCI.

10. The method according to claim 6, wherein the generating the HARQ-ACK feedback codebook based on the PDCCH detection opportunity set subsequent to the uplink DCI comprises:
    generating the HARQ-ACK feedback codebook based on a maximum quantity of PDCCH configured to schedule a PDSCH transmission in the PDCCH detection opportunity set subsequent to the uplink DCI; or
    generating the HARQ-ACK feedback codebook based on a PDSCH transmission position set capable of being scheduled by the downlink DCI in the PDCCH detection opportunity set subsequent to the uplink DCI.

11. A hybrid automatic repeat request-acknowledgement (HARQ-ACK) feedback method, performed by a network side device and comprising:
    when a HARQ-ACK of a physical downlink shared channel (PDSCH) is required to be received on a physical uplink shared channel (PUSCH) scheduled by uplink downlink control information (DCI), on determining that the uplink DCI comprises a downlink assignment index (DAI), receiving an HARQ-ACK feedback codebook received on the PUSCH, based on a maximum quantity of PDSCHs capable of being transmitted after the uplink DCI and a judgement result of whether the PDSCH scheduled before the uplink DCI is required to transmit the HARQ-ACK on the PUSCH in a multiplexing mode;
    and,
    when the HARQ-ACK of the PDSCH is required to be receiving on the PUSCH scheduled by the uplink DCI in a multiplexing mode, on determining that the uplink DCI does not include the DAI, receiving the HARQ-ACK feedback codebook transmitted on the PUSCH based on the sent PDSCH transmission or PDCCH transmission, wherein the receiving the HARQ-ACK feedback codebook transmitted on the PUSCH based on the sent PDSCH transmission or PDCCH transmission on determining that the uplink DCI does not include the DAI comprises:
    when the terminal is configured with a semi-static codebook by the network side device, receiving the HARQ-ACK feedback codebook based on the PDSCH sent in a first PDSCH position set, wherein the first PDSCH position set is a set of all PDSCH positions where the HARQ-ACK is required to be transmitted on the PUSCH;
    when the terminal is configured with a dynamic codebook by the network side device, receiving the HARQ-ACK feedback codebook based on the PDCCH sent in a first PDCCH detection opportunity set, wherein the first PDCCH detection opportunity set is a set of all PDCCH detection opportunities where the HARQ-ACK is required to be transmitted on the PUSCH.

12. The method according to claim 11, wherein the receiving the HARQ-ACK feedback codebook received on the PUSCH based on the judgement result of whether the PDSCH scheduled before the uplink DCI is required to transmit the HARQ-ACK on the PUSCH in a multiplexing mode and the maximum quantity of PDSCHs capable of being transmitted after the uplink DCI comprises:
    when the terminal is configured with a semi-static codebook by the network side device, on determining that the judgement result is that the PDSCH scheduled before the uplink DCI is required to transmit the HARQ-ACK on the PUSCH in a multiplexing mode, receiving the HARQ-ACK feedback codebook based on a set of all PDSCH positions where the HARQ-ACK is required to be transmitted on the PUSCH; and
    when the terminal is configured with a semi-static codebook, on determining that the judgement result is that the PDSCH scheduled before the uplink DCI is required to transmit the HARQ-ACK on the PUSCH in a multiplexing mode, receiving the HARQ-ACK feedback codebook based on a set of all PDSCH positions where the HARQ-ACK is required to be transmitted on the PUSCH.

13. The method according to claim 12, wherein the set of PDSCH positions subsequent to the uplink DCI is a set of PDSCH positions capable of being scheduled by a first downlink DCI, the first downlink DCI is sent in a first PDCCH detection opportunity, a starting positon of the first PDCCH detection opportunity is subsequent to a second PDCCH detection opportunity; or
    the set of the PDSCH positions subsequent to the uplink DCI is a set of PDSCH positions of which starting positions are subsequent to a second PDCCH detection opportunity;
    wherein the second PDCCH detection opportunity is configured to send the uplink DCI.

14. The method according to claim 11, wherein the receiving the HARQ-ACK feedback codebook received on the PUSCH, based on the judgement result of whether the PDSCH scheduled before the uplink DCI is required to transmit the HARQ-ACK on the PUSCH in a multiplexing mode and the maximum quantity of PDSCHs capable of being transmitted after the uplink DCI on determining that the uplink DCI comprises a DAI comprises:
    when the terminal is configured with a dynamic codebook, on determining that the judgement result is that the PDSCH scheduled before the uplink DCI is required to transmit the HARQ-ACK on the PUSCH in a multiplexing mode, receiving the HARQ-ACK feedback codebook based on all PDCCH detection opportunity sets and the DAI; and when the terminal is configured with a dynamic codebook, on determining that the judgement result is that the PDSCH scheduled before the uplink DCI is not required to transmit the HARQ-ACK on the PUSCH in a multiplexing mode, receiving the HARQ-ACK feedback codebook based on a PDCCH detection opportunity set subsequent to the uplink DCI.

15. The method according to claim 14, wherein the receiving the HARQ-ACK feedback codebook based on all PDCCH detection opportunity sets and the DAI comprises:

determining a bit number of a first part of feedback codebook based on the PDCCH detection opportunity set prior to the uplink DCI and the PDCCH sent in the PDCCH detection opportunity where the uplink DCI is located and the DAI;

determining a bit number of a second part of feedback codebook based on a PDCCH detection opportunity set subsequent to the uplink DCI; and obtaining a total bit number of the HARQ-ACK feedback codebook according to a bit number of the first part of feedback codebook and a bit number of the second part of feedback codebook;

wherein the determining the second part of feedback codebook based on the PDCCH detection opportunity set subsequent to the uplink DCI comprises:

determining the bit number of the second part of feedback codebook based on a maximum quantity of PDCCHs configured to schedule a PDSCH transmission in the PDCCH detection opportunity set subsequent to the uplink DCI; or determining the bit number of the second part of feedback codebook based on a PDSCH transmission position set capable of being scheduled by downlink DCI in a PDCCH detection opportunity set subsequent to the uplink DCI.

16. The method according to claim 14, wherein the receiving the HARQ-ACK feedback codebook based on the PDCCH detection opportunity set subsequent to the uplink DCI comprises:

receiving the HARQ-ACK feedback codebook based on a maximum quantity of PDCCH configured to schedule a PDSCH transmission in the PDCCH detection opportunity set subsequent to the uplink DCI; or receiving the HARQ-ACK feedback codebook based on a PDSCH transmission position set capable of being scheduled by the downlink DCI in the PDCCH detection opportunity set subsequent to the uplink DCI.

17. A network side device, comprising: a memory, a processor and a computer program stored in the memory and executable on the processor, wherein the processor is configured to execute the computer program to perform the hybrid automatic repeat request-acknowledgement (HARQ-ACK) feedback method according to claim 11.

18. A terminal, comprising: a memory, a processor and a computer program stored in the memory and executable on the processor, wherein the processor is configured to execute the computer program to perform:

when a HARQ-ACK of a physical downlink shared channel (PDSCH) is required to be transmitted on a physical uplink shared channel (PUSCH) scheduled by uplink downlink control information (DCI) in a multiplexing mode, on determining that the uplink DCI comprises a downlink assignment index (DAI), determining an HARQ-ACK feedback codebook transmitted on the PUSCH, based on a maximum quantity of PDSCHs capable of being transmitted after the uplink DCI and at least one of the DAI or a judgement result of whether the PDSCH scheduled before the uplink DCI is required to transmit the HARQ-ACK on the PUSCH in a multiplexing mode;

and when the HARQ-ACK of the PDSCH is required to be transmitted on the PUSCH scheduled by the uplink DCI in a multiplexing mode, on determining that the uplink DCI does not include the DAI, determining the HARQ-ACK feedback codebook transmitted on the PUSCH based on the received PDSCH transmission or PDCCH transmission, wherein the determining the HARQ-ACK feedback codebook transmitted on the PUSCH based on the received PDSCH transmission or PDCCH transmission on determining that the uplink DCI does not include the DAI comprises:

when the terminal is configured with a semi-static codebook, generating the HARQ-ACK feedback codebook based on the PDSCH received in a first PDSCH position set, wherein the first PDSCH position set is a set of all PDSCH positions where the HARQ-ACK is required to be transmitted on the PUSCH;

when the terminal is configured with a dynamic codebook, generating the HARQ-ACK feedback codebook based on the PDCCH received in a first PDCCH detection opportunity set, wherein the first PDCCH detection opportunity set is a set of all PDCCH detection opportunities where the HARQ-ACK is required to be transmitted on the PUSCH.

* * * * *